United States Patent
Gantman et al.

(10) Patent No.: US 9,787,695 B2
(45) Date of Patent: *Oct. 10, 2017

(54) METHODS AND SYSTEMS FOR IDENTIFYING MALWARE THROUGH DIFFERENCES IN CLOUD VS. CLIENT BEHAVIOR

(71) Applicant: QUALCOMM Incorporated, San Diego, CA (US)

(72) Inventors: Alexander Gantman, Solana Beach, CA (US); Rajarshi Gupta, Sunnyvale, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,461

(22) Filed: Mar. 24, 2015

(65) Prior Publication Data
US 2016/0285897 A1 Sep. 29, 2016

(51) Int. Cl.
*H04L 29/06* (2006.01)
*G06N 99/00* (2010.01)
(Continued)

(52) U.S. Cl.
CPC ........ *H04L 63/1416* (2013.01); *G06F 21/552* (2013.01); *G06F 21/56* (2013.01);
(Continued)

(58) Field of Classification Search
CPC ............. H04L 63/1416; H04L 63/1425; H04L 63/145; G06N 99/005
See application file for complete search history.

(56) References Cited

U.S. PATENT DOCUMENTS 8,060,074 B2 11/2011 Danford et al.
8,151,352 B1 4/2012 Novitchi
(Continued)

OTHER PUBLICATIONS

Shabtai et al., ("Andromaly": a behavioral malware detection framework for android devices, J Intell Inf Syst (2012) 38:161-190, Published online: Jan. 6, 2011, 30 pages).*

(Continued)

*Primary Examiner* — Oleg Korsak
(74) *Attorney, Agent, or Firm* — The Marbury Law Group

(57) ABSTRACT

A computing device may be configured to work in conjunction with another component (e.g., a server) to better determine whether a software application is benign or non-benign. This may be accomplished via the server performing static and/or dynamic analysis operations, generating a behavior information structure that describes or characterizes the range of correct or expected behaviors of the software application, and sending the behavior information structure to a computing device. The computing device may compare the received behavior information structure to a locally generated behavior information structure to determining whether the observed behavior of the software application differs or deviates from the expected behavior of the software application or whether the observed behavior is within the range of expected behaviors. The computing device may increase its level of security/scrutiny when the behavior information structure does not match the local behavior information structure.

30 Claims, 9 Drawing Sheets

(51) Int. Cl.
*G06F 21/55* (2013.01)
*G06F 21/56* (2013.01)

(52) U.S. Cl.
CPC ......... *G06N 99/005* (2013.01); *H04L 63/145* (2013.01); *H04L 63/1425* (2013.01); *G06F 2221/034* (2013.01)

(56) References Cited

U.S. PATENT DOCUMENTS

| | | |
|---|---|---|
| 8,782,792 B1 | 7/2014 | Bodke |
| 2013/0117848 A1 | 5/2013 | Golshan et al. |
| 2013/0303154 A1 | 11/2013 | Gupta et al. |
| 2013/0303159 A1 | 11/2013 | Gathala et al. |
| 2013/0304869 A1* | 11/2013 | Gupta ............... G06F 9/541 709/219 |
| 2013/0305358 A1 | 11/2013 | Gathala et al. |
| 2014/0130161 A1 | 5/2014 | Golovanov |
| 2015/0082428 A1 | 3/2015 | Dokey et al. |

OTHER PUBLICATIONS

International Search Report and Written Opinion—PCT/US2016/020193—ISA/EPO—May 17, 2016.

\* cited by examiner

METHODS AND SYSTEMS FOR IDENTIFYING MALWARE THROUGH DIFFERENCES IN CLOUD VS. CLIENT BEHAVIOR

FIELD

This invention relates generally to methods and systems for using behavioral and machine learning techniques to identify and respond to device behaviors that may contribute to that device's performance degradation over time, and more specifically to methods and systems for comparing a behavior information structure that characterizes a range of expected behaviors of a software application program to other behavior information structures to determine whether an observed behavior of the software application program differs or deviates from the expected behavior.

BACKGROUND

Cellular and wireless communication technologies have seen explosive growth over the past several years. Wireless service providers now offer a wide array of features and services that provide their users with unprecedented levels of access to information, resources, and communications. To keep pace with these enhancements, consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, an increasing number of mobile and wireless device users now use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, mobile devices are quickly becoming the next frontier for malware and cyber attacks. Accordingly, new and improved security solutions that better protect resource-constrained computing devices, such as mobile and wireless devices, will be beneficial to consumers.

SUMMARY

The various aspects include methods of analyzing behaviors of a software application operating in a computing device, including receiving in a processor of the computing device from a server computing device a behavior information structure that identifies a range of expected behaviors of the software application, monitoring activities of the software application to collect local behavior information, comparing the local behavior information and the received behavior information structure to generate comparison results, and using the comparison results to determine whether the observed behavior of the software application is within the range of expected behaviors of the software application. In an aspect, comparing the local behavior information and the received behavior information structure to generate comparison results may include using the collected behavior information to generate a local behavior information structure that characterizes an observed behavior of the software application, and comparing the generated local behavior information structure and the received behavior information structure to generate the comparison results.

In a further aspect, receiving the behavior information structure that identifies the range of expected behaviors of the software application may include receiving in the processor of the computing device a vector data structure that includes information derived from static and dynamic analysis operations performed in the server computing device. In a further aspect, the method may include sending the comparison results to the server computing device in response to determining that the observed behavior of the software application is not within the range of expected behaviors of the software application. In a further aspect, the method may include increasing a scrutiny level for evaluating the software application in response to determining that the observed behavior of the software application is not within the range of expected behaviors of the software application.

In a further aspect, the method may include using the local behavior information to generate a local behavior information structure that characterizes the observed behavior of the software application, and increasing the scrutiny level for evaluating the software application in response to determining that the observed behavior of the software application is not within the range of expected behaviors of the software application includes applying the generated local behavior information structure to a robust classifier model to generate analysis results, and using the analysis results to determine whether the software application is non-benign. In a further aspect, the method may include using the local behavior information to generate a local behavior information structure that characterizes the observed behavior of the software application, and applying the generated local behavior information structure to a lean classifier model to generate analysis results in response to determining that the observed behavior of the software application is within the range of expected behaviors of the software application, and using the analysis results to determine whether the software application is non-benign.

In a further aspect, the method may include using the local behavior information to generate a local behavior information structure that characterizes the observed behavior of the software application, and increasing the scrutiny level for evaluating the software application in response to determining that the observed behavior of the software application is not within the range of expected behaviors of the software application includes generating an application-specific classifier model, and applying the generated local behavior information structure to the generated application-specific classifier model. In a further aspect, generating the application-specific classifier model includes receiving a full classifier model that includes a plurality of test conditions, identifying device features used by the software application, identifying test conditions in the plurality of test conditions that evaluate the identified device features, and generating the application-specific classifier model to include the identified test conditions.

Further aspects may include a computing device having a processor configured with processor-executable instructions to perform operations that include receiving from a server computing device a behavior information structure that identifies a range of expected behaviors of a software application operating on the computing device, monitoring activities of the software application to collect local behavior information, comparing the local behavior information and the received behavior information structure to generate comparison results, and using the comparison results to determine whether the observed behavior of the software application is within the range of expected behaviors of the software application. In an aspect, the processor may be configured with processor-executable instructions to perform operations such that comparing the local behavior information and the received behavior information structure to generate comparison results includes using the collected behavior information to generate a local behavior information structure that characterizes an observed behavior of the software application, and comparing the generated local behavior information structure and the received behavior information structure to generate the comparison results.

In an aspect, the processor may be configured with processor-executable instructions to perform operations such that receiving the behavior information structure that identifies the range of expected behaviors of the software application may include receiving a vector data structure that includes information derived from static and dynamic analysis operations performed in the server computing device. In a further aspect, the processor may be configured with processor-executable instructions to perform operations further including sending the comparison results to the server computing device in response to determining that the observed behavior of the software application is not within the range of expected behaviors of the software application. In a further aspect, the processor may be configured with processor-executable instructions to perform operations further including increasing a scrutiny level for evaluating the software application in response to determining that the observed behavior of the software application is not within the range of expected behaviors of the software application.

In a further aspect, the processor may be configured with processor-executable instructions to perform operations that further include using the local behavior information to generate a local behavior information structure that characterizes the observed behavior of the software application, and the processor may be configured with processor-executable instructions to perform operations such that increasing the scrutiny level for evaluating the software application in response to determining that the observed behavior of the software application is not within the range of expected behaviors of the software application includes applying the generated local behavior information structure to a robust classifier model to generate analysis results, and using the analysis results to determine whether the software application is non-benign. In a further aspect, the processor may be configured with processor-executable instructions to perform operations further including using the local behavior information to generate a local behavior information structure that characterizes the observed behavior of the software application, applying the generated local behavior information structure to a lean classifier model to generate analysis results in response to determining that the observed behavior of the software application is within the range of expected behaviors of the software application, and using the analysis results to determine whether the software application is non-benign.

In a further aspect, the processor may be configured with processor-executable instructions to perform operations that further include using the local behavior information to generate a local behavior information structure that characterizes the observed behavior of the software application, and the processor may be configured with processor-executable instructions to perform operations such that increasing the scrutiny level for evaluating the software application in response to determining that the observed behavior of the software application is not within the range of expected behaviors of the software application includes generating an application-specific classifier model, and applying the generated local behavior information structure to the generated application-specific classifier model. In a further aspect, the processor may be configured with processor-executable instructions to perform operations such that generating the application-specific classifier model includes receiving a full classifier model that includes a plurality of test conditions, identifying device features used by the software application, identifying test conditions in the plurality of test conditions that evaluate the identified device features, and generating the application-specific classifier model to include the identified test conditions.

Further aspects include a non-transitory computer readable storage medium having stored thereon processor-executable software instructions configured to cause a processor of a computing device to perform operations for analyzing behaviors of a software application operating in the computing device, the operations including receiving from a server computing device a behavior information structure that identifies a range of expected behaviors of the software application, monitoring activities of the software application to collect local behavior information, comparing the real-time the local behavior information and the received behavior information structure to generate comparison results, and using the comparison results to determine whether the observed behavior of the software application is within the range of expected behaviors of the software application. In an aspect, the stored processor-executable software instructions may be configured to cause a processor to perform operations such that comparing the real-time the local behavior information and the received behavior information structure to generate comparison results includes using the collected behavior information to generate a local behavior information structure that characterizes an observed behavior of the software application, comparing the generated local behavior information structure and the received behavior information structure to generate the comparison results.

In an aspect, the stored processor-executable software instructions may be configured to cause a processor to perform operations such that receiving the behavior information structure that identifies the range of expected behaviors of the software application may include receiving in the processor of the computing device a vector data structure that includes information derived from static and dynamic analysis operation performed in the server computing device. In an aspect, the stored processor-executable software instructions may be configured to cause a processor to perform operations further including sending the comparison results to the server computing device in response to determining that the observed behavior of the software application is not within the range of expected behaviors of the software application. In an aspect, the stored processor-executable software instructions may be configured to cause a processor to perform operations further including increasing a scrutiny level for evaluating the software application in response to determining that the observed behavior of the software application is not within the range of expected behaviors of the software application.

In an aspect, the stored processor-executable software instructions may be configured to cause a processor to perform operations that further include using the local behavior information to generate a local behavior information structure that characterizes the observed behavior of the software application, and the stored processor-executable software instructions may be configured to cause a processor to perform operations such that increasing the scrutiny level for evaluating the software application in response to determining that the observed behavior of the software application is not within the range of expected behaviors of the software application includes applying the generated local behavior information structure to a robust classifier model to generate analysis results, and using the analysis results to determine whether the software application is non-benign. In an aspect, the stored processor-executable software instructions may be configured to cause a processor to perform operations further including using the local behavior information to generate a local behavior information structure that characterizes the observed behavior of the software application, applying the generated local behavior information structure to a lean classifier model to generate analysis results in response to determining that the observed behavior of the software application is within the range of expected behaviors of the software application, and using the analysis results to determine whether the software application is non-benign.

In an aspect, the stored processor-executable software instructions may be configured to cause a processor to perform operations that further include using the local behavior information to generate a local behavior information structure that characterizes the observed behavior of the software application, and the stored processor-executable software instructions may be configured to cause a processor to perform operations such that increasing the scrutiny level for evaluating the software application in response to determining that the observed behavior of the software application is not within the range of expected behaviors of the software application includes generating an application-specific classifier model, and applying the generated local behavior information structure to the generated application-specific classifier model. In an aspect, the stored processor-executable software instructions may be configured to cause a processor to perform operations such that generating the application-specific classifier model includes receiving a full classifier model that includes a plurality of test conditions, identifying device features used by the software application, identifying test conditions in the plurality of test conditions that evaluate the identified device features, and generating the application-specific classifier model to include the identified test conditions.

Further aspects include a computing device that includes means for receiving from a server computing device a behavior information structure that identifies a range of expected behaviors of a software application operating on the computing device, means for monitoring activities of the software application to collect local behavior information, means for comparing the real-time the local behavior information and the received behavior information structure to generate comparison results, and means for using the comparison results to determine whether the observed behavior of the software application is within the range of expected behaviors of the software application. In an aspect, the means for comparing the real-time the local behavior information and the received behavior information structure to generate comparison results may include means for using the collected behavior information to generate a local behavior information structure that characterizes an observed behavior of the software application, and means for comparing the generated local behavior information structure and the received behavior information structure to generate the comparison results.

In an aspect, the computing device includes means for increasing a scrutiny level for evaluating the software application in response to determining that the observed behavior of the software application is not within the range of expected behaviors of the software application. In a further aspect, means for increasing the scrutiny level for evaluating the software application in response to determining that the observed behavior of the software application is not within the range of expected behaviors of the software application includes means for applying the generated local behavior information structure to a robust classifier model to generate analysis results, and means for using the analysis results to determine whether the software application is non-benign. In an aspect, the computing device includes means for applying the generated local behavior information structure to a lean classifier model to generate analysis results in response to determining that the observed behavior of the software application is within the range of expected behaviors of the software application, and means for using the analysis results to determine whether the software application is non-benign.

In a further aspect, means for increasing the scrutiny level for evaluating the software application in response to determining that the observed behavior of the software application is not within the range of expected behaviors of the software application includes means for generating an application-specific classifier model, and means for applying the generated local behavior information structure to the generated application-specific classifier model. In a further aspect, means for generating the application-specific classifier model includes means for receiving a full classifier model that includes a plurality of test conditions, means for identifying device features used by the software application, means for identifying test conditions in the plurality of test conditions that evaluate the identified device features, and means for generating the application-specific classifier model to include the identified test conditions.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
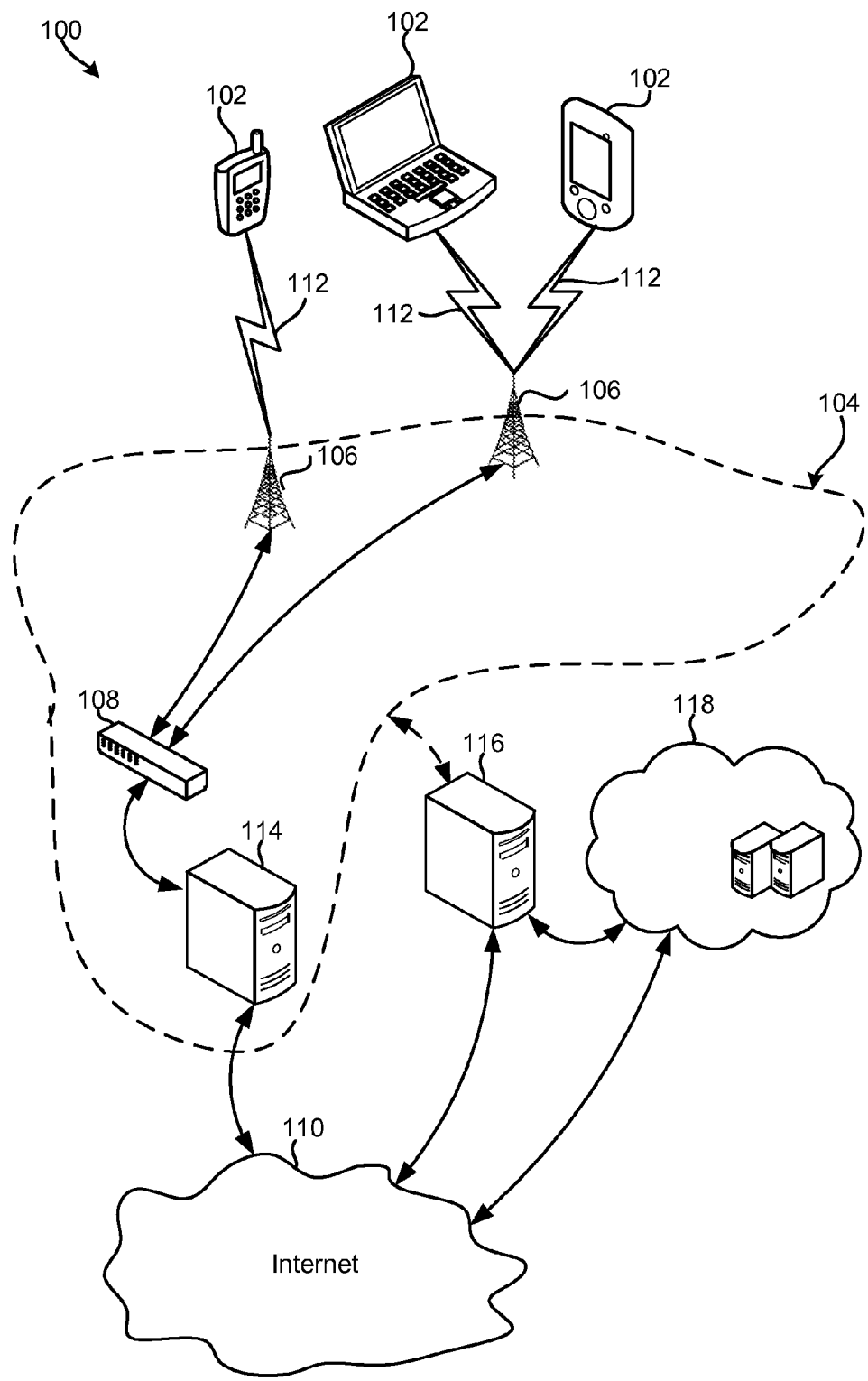
FIG. 1A is a communication system block diagram illustrating network components of an example telecommunication system that is suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods that may be implemented on servers and other computing devices (e.g., mobile or other resource-constrained computing devices) to efficiently identify, classify, model, prevent, and/or correct the conditions and/or device behaviors that may degrade a computing device's performance and/or power utilization levels. A server configured according to some embodiments may be a server in a cloud network and/or associated with an application download service (e.g., Apple® App Store, Windows® Store, Google® play, etc.). Such an embodiment server may be configured to emulate normal behaviors of a computing device and/or to perform static and/or dynamic analysis operations to determine whether a software application program is benign or non-benign (e.g., malware, etc.). The server may quarantine the application program or take other appropriate measures in response to determining that the software application program is non-benign. For example, the server may prevent computing devices from downloading the software application when the results of the static and/or dynamic analysis indicate that the software application is malware.

In response to determining that the software application program is benign (e.g., that the application is not malware, etc.), the server may use the emulation and/or analysis results (e.g., results generated from performing the static and/or dynamic analysis operations) to generate a behavior information structure (e.g., a behavior vector, vector list, etc.) that succinctly describes or characterizes a range of correct or expected behaviors of the application program in one or more data-structures (e.g., in the form of a string of numbers, etc.). Said another way, the server may generate a vector data structure (or vector list, etc.) that includes information derived from static and dynamic analysis operations performed in the server computing device. The server may send the generated behavior information structure (e.g., a vector or vector list, etc.) to computing devices that download, include, or use the software application. For example, the server may bundle the behavior information structure with the software application program so that both are downloaded from an application download service concurrently. The server may also identify computing devices that previously downloaded the software application program and send the behavior information structure to the identified computing devices when the application is installed, updated, launched, etc.

Client computing devices (e.g., mobile or other resource-constrained computing devices) may be equipped with a behavior-monitoring security system that is configured to use behavioral analysis and machine learning techniques to identify, prevent, and/or correct non-benign behaviors. The behavior-monitoring security system may be configured to monitor device behaviors, generate behavior information structures, apply the behavior information structures to classifier models to generate behavior analysis results, and use the behavior analysis results to determine whether a software application or device behavior is non-benign.

In addition, the behavior-monitoring security system may be configured to receive the behavior information structure (e.g., vectors, a vector list, or other information structure, etc.) that characterizes the range of expected behaviors of the software application program from the server, and compare the received behavior information structure to behavior information structures generated by a behavior extractor module in the computing device to determine whether an observed behavior of the software application program differs or deviates from the expected behavior. For example, the computing device may receive a list that identifies a range of expected behaviors from the server, and determine whether the locally generated behavior information structure (or the behavior it characterizes) is included in the received list. As a further example, when software application program (or apps) are provided to the application download service they will be tested to ensure proper behavior, and such testing may provide a good behavior model. After the user downloads the software application program, malware may impact the behavior of those software application program when later executing on the client device. To address this, the computing device may receive the tested correct application behavior information, and compare that information to the behavior information collected in the computing device when the software application program is actually executing to determine whether the observed behavior is unexpected.

The computing device may increase its level of security or scrutiny in response to determining that the observed behavior is unexpected, or that the locally generated behavior information structure is not included in the received list or that the received behavior information structure does not match its corresponding local behavior information structure (i.e., when the comparison results indicate that an observed behavior of the software application differs or deviates from the expected behavior). The computing device may also send the results of its analysis to the server, which may receive and use these results to further analyze the software application to determine whether it is malware and/or to better determine the range of normal or expected behaviors of the software application.

Thus, various embodiments may include a server that is configured to emulate normal behaviors of a computing device when executing a particular application (via static and dynamic analysis techniques), and provide a computing device with a range of expected behaviors (e.g., via a behavior information structure, vector, list, etc.) that the computing device should exhibit when executing that application. The embodiments may also include a client computing device that is configured to compare the received expected behavior range (e.g., behavior identified via the behavior information structure, vector, list, etc.) to its own behaviors when executing the software application to determine whether there are deviations between observed and expected behaviors. The client computing device may mark software applications that exhibit such deviations as suspicious, and focus its operations on collecting additional or more detailed information for analyzing these software applications.

Many modern computing are resource constrained systems that have relatively limited processing, memory, and energy resources. For example, a mobile device is a complex and resource constrained computing device that includes many features or factors that could contribute to its degradation in performance and power utilization levels over time. Examples of factors that may contribute to performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of these complex yet resource-constrained systems. As such, it is difficult for users, operating systems, or application programs (e.g., anti-virus software, etc.) to accurately and efficiently identify the sources of such problems. As a result, mobile device users currently have few remedies for preventing the degradation in performance and power utilization levels of a mobile device over time, or for restoring an aging mobile device to its original performance and power utilization levels.

The various embodiments discussed in this application are especially well suited for use in resource constrained-computing devices, such as mobile devices, because they do not require evaluating a very large corpus of behavior information, generate classifier/behavior models dynamically to account for device-specific or application-specific features of the computing device, intelligently prioritize the features that are tested/evaluated by the classifier/behavior models, are not limited to evaluating an individual application program or process, intelligently identify the factors or behaviors that are to be monitored by the computing device, accurately and efficiently classify the monitored behaviors, and/or do not require the execution of computationally-intensive processes. For all these reasons, the various embodiments may be implemented or performed in a resource-constrained computing device without having a significant negative and/or user-perceivable impact on the responsiveness, performance, or power consumption characteristics of the device.

For example, modern mobile devices are highly configurable and complex systems. As such, the factors or features that are most important for determining whether a particular device behavior is benign or not benign (e.g., malicious or performance-degrading) may be different in each mobile device. Further, a different combination of factors/features may require monitoring and/or analysis in each mobile device in order for that device to quickly and efficiently determine whether a particular behavior is benign or not benign. Yet, the precise combination of factors/features that require monitoring and analysis, and the relative priority or importance of each feature or feature combination, can often only be determined using device-specific information obtained from the specific computing device in which the behavior is to be monitored or analyzed. For these and other reasons, classifier models generated in any computing device other than the specific device in which they are used cannot include information that identifies the precise combination of factors/features that are most important to classifying a software application or device behavior in that specific device. That is, by generating classifier models in the specific computing device in which the models are used, the various embodiments generate improved models that better identify and prioritize the factors/features that are most important for determining whether a software application, process, activity or device behavior is benign or non-benign.

The various embodiments improve the functioning of a computing device by improving its security, performance, and power consumption characteristics. For example, by comparing detected behaviors to a range of expected behaviors to determine whether an application is suspicious (as opposed to applying behavior vectors to classifier models), the various embodiments allow the computing device to intelligently determine whether to perform robust or lightweight analysis operations. This improves the device's performance and power consumption characteristics by allowing the device to forgo performing spurious operations and/or by allowing the device focus its operations on analyzing the most suspicious behaviors. Additional improvements to the functions, functionalities, and/or functioning of computing devices will be evident from the detailed descriptions of the embodiments provided below.

The word "exemplary" is used herein to mean "serving as an example, instance, or illustration." Any implementation described herein as "exemplary" is not necessarily to be construed as preferred or advantageous over other implementations.

The terms "not benign" and "non-benign" are used interchangeably herein to refer to any of a variety of behaviors, activities, and conditions that may degrade the performance of a computing device over time, such as those that cause longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the device or utilizing the device for spying or botnet activities, etc.

The terms "wireless device," "mobile device," and "mobile computing device" are used generically and interchangeably herein to refer to any of a variety of computing devices, including cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar electronic devices that include a memory, a programmable processor for which performance is important. While the various embodiments are particularly useful for mobile computing devices that are resource-constrained systems, the various embodiments are generally useful in any computing device that includes a processor and executes software applications.

Mobile computing devices may be equipped with a behavior-monitoring security system, such as a comprehensive behavioral monitoring and analysis system, that is configured to use machine learning and/or behavioral analysis techniques to intelligently and efficiently identify, prevent, and/or correct the conditions, factors, and/or device behaviors that often degrade a mobile device's performance and/or power utilization levels over time.

The behavioral monitoring and analysis system may include an observer process, daemon, module, or sub-system (herein collectively referred to as a "module"), a behavior extractor module, and an analyzer module. The observer module may be configured to instrument or coordinate various application programming interfaces (APIs), registers, counters or other components (herein collectively "instrumented components") at various levels of the computing device system. The observer module may repeatedly or continuously (or near continuously) monitor activities of the computing device by collecting behavior information from the instrumented components. In an embodiment, this may be accomplished by reading information from API log files stored in a memory of the computing device.

The observer module may communicate (e.g., via a memory write operation, function call, etc.) the collected behavior information to the behavior extractor module, which may use the collected behavior information to generate behavior information structures that each represent or characterize many or all of the observed behaviors that are associated with a specific software application, module, component, task, or process of the mobile device. Each behavior information structure may encapsulate one or more "behavior features." Each behavior feature may be an abstract number that represents all or a portion of an observed behavior. In addition, each behavior feature may be associated with a data type that identifies a range of possible values, operations that may be performed on those values, meanings of the values, etc. The data type may include information that may be used to determine how the feature (or feature value) should be measured, analyzed, weighted, or used.

The behavior extractor module may communicate (e.g., via a memory write operation, function call, etc.) the generated behavior information structures to the analyzer module. The analyzer module may apply the behavior information structures to classifier models to generate analysis results, and use the analysis results to determine whether a software application or device behavior is benign or non-benign (e.g., malicious, poorly written, performance-degrading, etc.).

A classifier model may be a behavior model that includes data and/or information structures (e.g., feature vectors, behavior vectors, component lists, decision trees, decision nodes, etc.) that may be used by the computing device (or a device processor in the computing device) to evaluate a specific feature or embodiment of the device's behavior. A classifier model may also include decision criteria for monitoring and/or analyzing a number of features, factors, data points, entries, APIs, states, conditions, behaviors, software applications, processes, operations, components, etc. (herein collectively referred t to as "features") in the computing device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A locally generated lean classifier model is a lean classifier model that is generated in the computing device. As an example, a computing device may be may be configured to receive a full classifier model from a network server, generate a lean classifier model in the computing device based on the full classifier, and use the locally generated lean classifier model to classify a behavior of the device as being either benign or non-benign (i.e., malicious, performance degrading, etc.).

The analyzer module may be configured to notify the observer module in response to determining that a device behavior is suspicious (i.e., in response to determining that the results of the analysis operations are not sufficient to classify the behavior as either benign or non-benign). In response, the observer module may adjust the granularity of its observations (i.e., the level of detail at which computing device features are monitored) and/or change the factors/behaviors that are observed based on information received from the analyzer module (e.g., results of the real-time analysis operations), generate or collect new or additional behavior information, and send the new/additional information to the analyzer module for further analysis. Such feedback communications between the observer and analyzer modules enable the computing device (or its device processor) to recursively increase the granularity of the observations (i.e., make finer or more detailed observations) or change the features/behaviors that are observed until behavior is classified as either benign or non-benign, until a processing or battery consumption threshold is reached, or until the computing device determines that the source of the suspicious or performance-degrading computing device behavior cannot be identified from further increases in observation granularity. Such feedback communication also enable the computing device to adjust or modify the classifier models locally in the computing device without consuming an excessive amount of the computing device's processing, memory, or energy resources.

The above-mentioned behavioral monitoring and analysis system is generally very effective, and allows a computing device to identify and react to performance-limiting and undesirable operating conditions without consuming an excessive amount of its processing, memory, or energy resources. This is particularly useful in complex and resource constrained systems, such as mobile computing devices which have relatively limited processing, memory, and energy resources.

In mobile computing devices there are a large variety of factors that may contribute to the degradation in performance and power utilization levels of such devices over time, including poorly written or designed software applications, malware, viruses, fragmented memory, background processes, etc. Due to the number, variety, and complexity of these factors, it is often not feasible to evaluate all of the factors that may contribute to the degradation in performance and/or power utilization levels of the complex yet resource-constrained systems of modern mobile computing devices. As such, it is difficult for users, operating systems, and/or application programs (e.g., anti-virus software, etc.) to accurately and efficiently identify the sources of such problems. To provide better performance in view of these facts, the mobile device may be equipped with the above-described behavioral monitoring and analysis system so that it may quickly determine whether a particular mobile device behavior, condition, sub-system, software application, or process is benign or not benign without consuming an excessive amount of its processing, memory, or energy resources.

While the above-described behavioral monitoring and analysis system is generally very effective for identifying non-benign behaviors, the security, performance and power consumption characteristics of the device could be further improved by configuring the system to quickly and intelligently identifying the behaviors that require robust analysis. By configuring the computing device to receive and use information identifying the range of correct, normal, or expected behaviors of a software application from a network server, the various embodiments allow the computing device to quickly and intelligently identify the behaviors that require robust analysis, thereby further improving the security, performance and power consumption characteristics of the device.

In an embodiment, the server computing device may be configured to perform static analysis operations to generate static analysis results, use the static analysis results to determine the range of expected behaviors for a software application, generate a information structure (e.g., a vector or vector list) that identifies the range of expected behaviors, and send the generated information structure to a client computing device equipped with a behavioral monitoring and analysis system. In various embodiments, the static analysis operations may include analyzing byte code (e.g., code of a software application uploaded to an application download service) to identify codepaths, evaluating the intent of the software application (e.g., to determine whether it is malicious, etc.), and performing other similar operations to identify all or many of the possible operations or behavior of the software application.

In an embodiment, the server computing device may be configured to perform dynamic analysis operations to generate dynamic analysis results, use the dynamic analysis results to determine the range of expected behaviors for a software application, generate an information structure (e.g., a vector or a vector list) that identifies the range of expected behaviors, and send the generated information structure to a client computing device equipped with a behavioral monitoring and analysis system. In various embodiments, the dynamic analysis operations may include executing the byte code via an emulator (e.g., in the cloud, etc.) to determine all or many of its behaviors and/or to identify non-benign behaviors.

In an embodiment, the server may be configured to perform both static and dynamic analysis operations, and use a combination of the information generated from the static and dynamic analysis operations (e.g., a combination of the static and dynamic analysis results) to determine the range of expected behaviors for a software application. For example, the server may be configured to use static analysis to populate the behavior information structure with expected behaviors based on API usage and/or codepaths, and to use dynamic analysis to populate the behavior information structure based on emulated behaviors and their associated statistics, such as the frequency that the features were excited or used.

The computing device may be configured to receive the behavior information structure (e.g., a vector, list or other information structure) that identifies the range of correct or expected behaviors of a software application from the server, compare the received behavior information structure to behavior information structures generated locally in the computing device to determine whether an observed behavior of the software application differs or deviates from the expected behavior, and increase its level of security or scrutiny in response to determining that a received behavior information structure does not match its corresponding local behavior information structure (i.e., when the comparison results indicate that an observed behavior of the software application differs or deviates from the expected behavior). In an embodiment, the computing device may be configured to perform lightweight or low-power analysis operations when the comparison results indicate that the observed behavior is within the range of expected behaviors, and to perform more robust or power-intensive behavioral analysis operations when the comparison results indicate that the observed behavior is outside the range of expected behaviors. In an embodiment, the computing device may be configured to forgo performing additional behavior-based analysis operations when the comparison results indicate that the observed behavior is within the range of expected behaviors.

The various embodiments may be implemented within a variety of communication systems, such as the example communication system 100 illustrated in FIG. 1A. A cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network servers 116 and the telephone network 104 may be through the Internet 110 or through a private network (as illustrated by the dashed arrows). A network server 116 may also be implemented as a server within the network infrastructure of a cloud service provider network 118. Communication between the network server 116 and the mobile devices 102 may be achieved through the telephone network 104, the internet 110, private network (not illustrated), or any combination thereof.

The network server 116 may be configured to receive information on various conditions, features, behaviors, and corrective actions from many mobile devices 102 or a central database or cloud service provider network 118, and use this information to generate data, algorithms, classifiers, or behavior models (herein collectively "classifier models") that include data and/or information structures (e.g., feature vectors, behavior vectors, component lists, etc.) that may be used by a processor of a computing device to evaluate a specific embodiment of a mobile device's behavior.

In an embodiment, the network server 116 may be configured to generate a full classifier model. The network server 116 may be configured to use the full classifier models to analyze or classify behaviors of the mobile device 102 and/or the behaviors of the behavioral monitoring and analysis system of the mobile device 102. The network server 116 may also be configured to send the full classifier models to the mobile device 102. In an embodiment, the network server 116 may be configured to generate the full classifier model to include all or most of the features, data points, and/or factors that could contribute to the degradation of any of a number of different makes, models, and configurations of mobile devices 102. In various embodiments, the network server may be configured to generate the full classifier model to describe or express a large corpus of behavior information as a finite state machine, decision nodes, decision trees, or in any information structure that can be modified, culled, augmented, or otherwise used to quickly and efficiently generate leaner classifier models.

In addition, the network server 116 may be configured to emulate normal behaviors of a computing device and/or to perform static and/or dynamic analysis operations to determine whether a software application program is benign or non-benign (e.g., malware, etc.). The network server 116 may quarantine the application program or take other appropriate measures in response to determining that the software application program is non-benign. In response to determining that the software application program is benign (e.g., that the application is not malware, etc.), the network server 116 use the results of the emulation and/or analysis to generate a behavior information structure (e.g., a vector, vector list, etc.) that succinctly describes or characterizes a range of correct or expected behaviors of the application program in one or more information structures, such as vector datastructures (e.g., in the form of a string of numbers, etc.). The server may then send the generated behavior information structure (e.g., vector, vector list, etc.) to one or more of the mobile devices 102.

The mobile device 102 may be configured to receive a full classifier model from the network server 116, and use the received full classifier model to monitor, analyze, and/or classify the behaviors of the mobile device 102. The mobile device 102 may be further configured to use the full classifier model to generate more focused classifier models that account for the specific features and functionalities of the software applications of the mobile device 102. For example, the mobile device 102 may generate application-specific and/or application-type-specific classifier models (i.e., data or behavior models) that preferentially or exclusively identify or evaluate the conditions or features of the mobile device that are relevant to a specific software application or to a specific type of software application (e.g., games, navigation, financial, etc.) that is installed on the mobile device 102 or stored in a memory of the mobile device 102. The mobile device 102 may use these locally generated classifier models to perform real-time behavior monitoring and analysis operations.

The mobile device 102 may also be configured to receive and use the behavior information structure (e.g., vector, vector list, etc.) to quickly and efficiently determine whether behaviors detected in the device 102 are within the normal range of expected behaviors of that application. For example, the mobile device may include a device processor that is configured to forgo generating application-specific classifier models for a software application based on the result of comparing a locally generated behavior information structure to the behavior information structure (e.g., vector, vector list, etc.) received from the network server 116. The device processor may also be configured to generate and use application-specific classifier models for the software application based on the result of comparing the locally generated behavior information structure to the behavior information structure received from the network server 116.

Figure 1B:
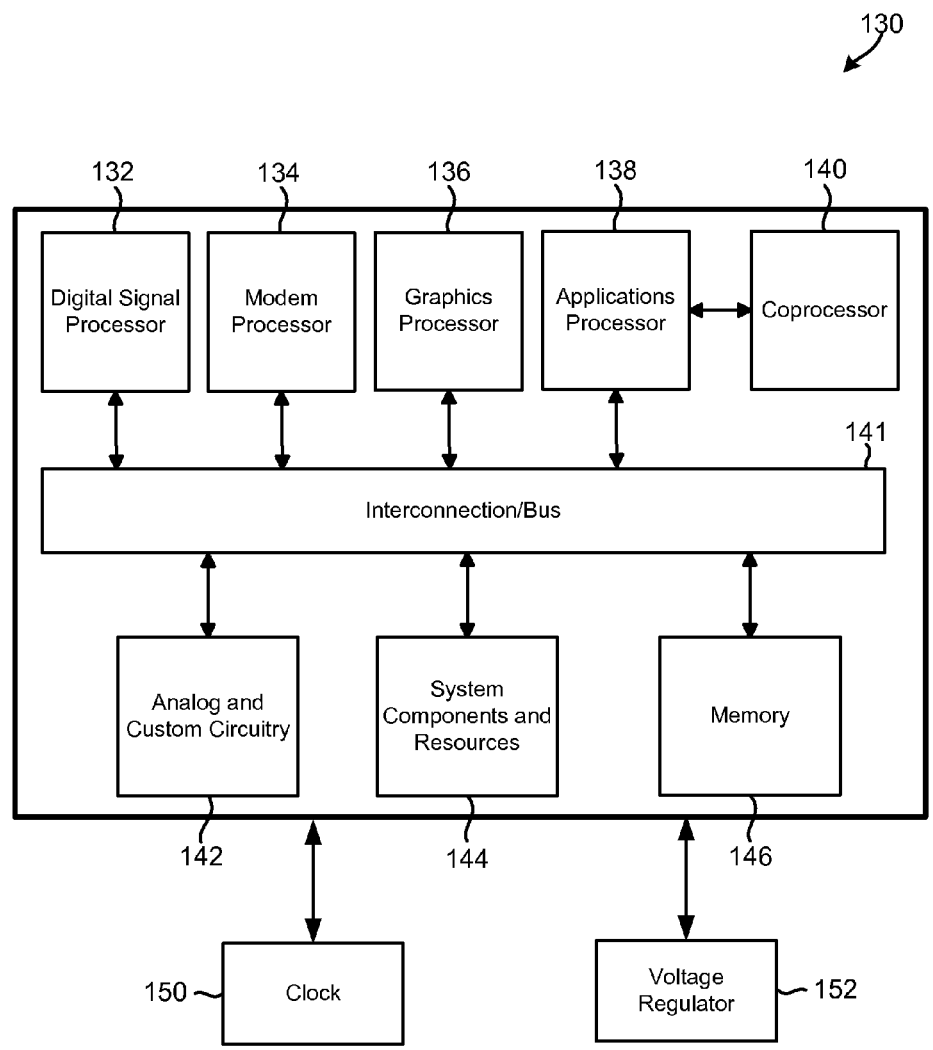
FIG. 1B is an architectural diagram of an example system on chip that may be included in an embodiment computing device and/or used to implement various embodiments.

FIG. 1B is an architectural diagram illustrating an example system-on-chip (SOC) 100 architecture that may be used in computing devices implementing the various embodiments, such as in the mobile devices 102 illustrated in FIG. 1A. The SOC 130 may include a number of heterogeneous processing cores or processors, such as a digital signal processor (DSP) 132, a modem processor 134, a graphics processor 136, and an application processor 138. The SOC 130 may also include one or more coprocessors 140 (e.g., vector co-processor) connected to one or more of the processors 132-138.

Each processor/processing core (e.g., processors 132-138) may include one or more cores, each of which may be configured to perform operations independent of the other processors/cores. Further, each processor/processing core may include an operating system that performs memory management operations independent of the other operating systems and processor/processing cores in the system. For example, the multiprocessor system may include a first processing core that executes a first type of operating system (e.g., FreeBSD, LINUX, OS X, etc.) and a second processing core that executes a second type of operating system (e.g., Microsoft Windows 10, etc.). Each of these operating systems may include a memory management system for managing the allocation and use of system memory 146 by software application programs executing on that processing core. For example, each operating system may include a virtual memory manager (OS VMM) configured to allocate virtual memory addresses to the application programs and ensure that memory used by one process does not interfere with memory already in use by another process. When a process requires access to the physical memory, these virtual addresses may be translated to physical memory addresses by a memory management unit (MMU) that is specific to that processing core.

The SOC 130 may also include analog circuitry and custom circuitry 142 for managing sensor data, analog-to-digital conversions, wireless data transmissions, and for performing other specialized operations, such as processing encoded audio signals for games and movies. The SOC 130 may include system components and resources 144, such as voltage regulators, oscillators, phase-locked loops, peripheral bridges, data controllers, memory controllers, system controllers, access ports, timers, and other similar components used to support the processors and clients running on a computing device. The resources/system components and custom circuitry may include circuitry to interface with peripheral devices, such as cameras, electronic displays, wireless communication devices, external memory chips, etc.

The processors/processing cores (e.g., DSP 132, modem processor 134, graphics processor 136, applications processor 138, etc.) may be interconnected to the memory 146 elements, resources 144, and custom circuitry 142 via an interconnection/bus module 141, which may include an array of reconfigurable logic gates and/or implement a bus architecture (e.g., CoreConnect, AMBA, etc.). Communications may be provided by advanced interconnects, such as high performance networks-on chip (NoCs).

The SOC 130 may further include an input/output module (not illustrated) for communicating with resources external to the SOC 130, such as a clock 150 and a voltage regulator 152. Resources external to the SOC (e.g., clock 150, voltage regulator 152) may be shared by two or more of the internal SOC processors/cores (e.g., DSP 132, modem processor 134, graphics processor 136, applications processor 138, etc.).

The SOC 100 may also include hardware and/or software components suitable for interfacing with speakers, receiving inputs from user interface elements (e.g., input buttons, touch screen display, etc.), receiving audio data from microphone arrays, and collecting sensor data from sensors including sensors for monitoring physical conditions (e.g., location, direction, motion, orientation, vibration, pressure, etc.), cameras, compasses, GPS receivers, communications circuitry (e.g., Cellular, Bluetooth®, WLAN, WiFi, etc.), and other well known components (e.g., accelerometer, gyroscopes, etc.) of modern electronic devices.

The processors/processing cores (e.g., DSP 132, modem processor 134, graphics processor 136, applications processor 138, etc.) may be independent processing cores that are in close proximity (e.g., on a single substrate, die, integrated chip, etc.) to one another. The proximity of the processors allows for the sharing of on-chip memory 146 and for more coordinated cooperation between cores. In addition, the proximity of the processors also allows the memory 146 to operate at a much higher frequency/clock-rate than is possible if data signals have to travel off-chip.

Figure 2:
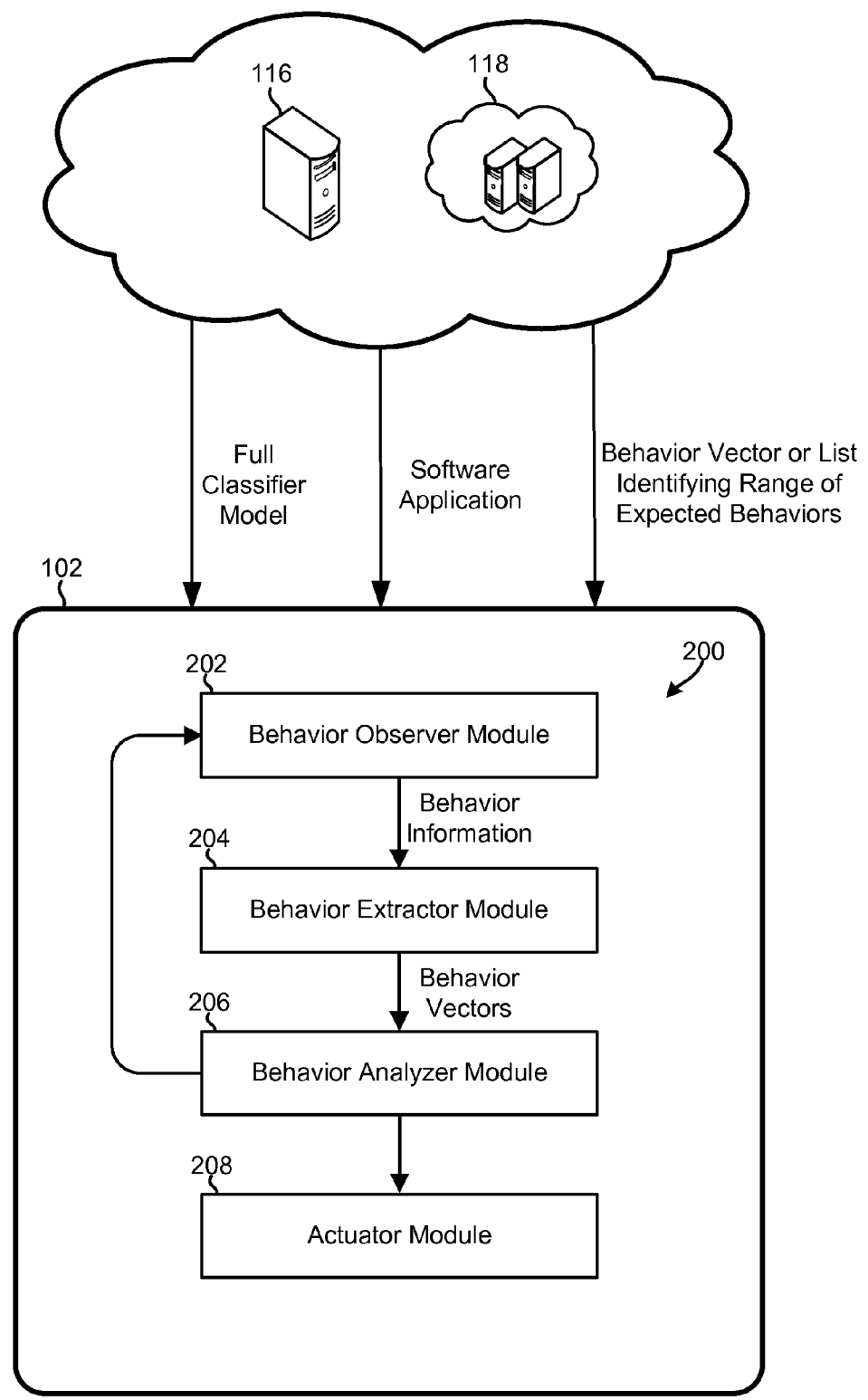
FIG. 2 is a block diagram illustrating example logical components and information flows in an embodiment computing device configured to use behavioral analysis and machine learning techniques to classify behaviors as benign or non-benign.

FIG. 2 illustrates example logical components and information flows in an embodiment computing device 102 that includes a comprehensive behavioral monitoring and analysis system 200 configured to use behavioral analysis techniques to identify and respond to non-benign device behaviors. In the example illustrated in FIG. 2, the computing device is a mobile device 102 that includes a device processor (i.e., mobile device processor), which may be any or all of the processors/processing cores illustrated in FIG. 1B, such as a DSP 132, modem processor 134, graphics processor 136, applications processor 138, etc. The device processor may be configured with executable instruction modules that include a behavior observer module 202, a behavior extractor module 204, a behavior analyzer module 206, and an actuator module 208. Each of the modules 202-208 may be a thread, process, daemon, module, sub-system, or component that is implemented in software, hardware, or a combination thereof. In various embodiments, the modules 202-210 may be implemented within parts of the operating system (e.g., within the kernel, in the kernel space, in the user space, etc.), within separate programs or applications, in specialized hardware buffers or processors, or any combination thereof. In an embodiment, one or more of the modules 202-208 may be implemented as software instructions executing on one or more processors of the mobile device 102.

In the example illustrated in FIG. 2, a network server 116 or a server within the network infrastructure of a cloud service provider network 118 may be configured to emulate normal behaviors of the mobile device 102 and/or to perform static and/or dynamic analysis operations to determine whether a software application program is benign or non-benign (e.g., malware, etc.). The server 116, 118 may quarantine the application program or take other appropriate measures in response to determining that the software application program is non-benign. For example, a server 116, 118 may prevent computing devices from downloading the software application when the results of the static and/or dynamic analysis indicate that the software application is malware.

In response to determining that the software application program is benign (e.g., that the application is not malware, etc.), the server 116, 118 may use the emulation and/or analysis results (e.g., results generated from performing the static and/or dynamic analysis operations) to generate a behavior information structure (e.g., vector, vector list, etc.) that succinctly describes or characterizes a range of correct or expected behaviors of the software application program in one or more structures (e.g., a vector data-structure that includes a string of numbers, a vector list, etc.). The server 116, 118 may send the generated behavior information structure (e.g., vector, vector list, etc.) to computing devices that download, include, or use the software application program. For example, the server 116, 118 may bundle generated behavior information structures with their corresponding software application so that both the information structures and the application are downloaded concurrently. The server 116, 118 may also identify computing devices (e.g., the mobile device 102, etc.) that previously downloaded the software application program, and send the behavior information structure to the identified computing devices when the application is installed, updated, launched, etc.

A device processor (e.g., DSP 132, modem processor 134, graphics processor 136, applications processor 138, etc.) in the mobile device 102 may be configured to receive the behavior information structures from the server 116, 118, and compare the received behavior vector to behavior information structure (e.g., vector, other structures) generated in the computing device to determine whether an observed behavior of the software application program differs or deviates from the expected behavior. For example, the device processor in the mobile device 102 may receive a list that identifies a range of expected behaviors from server 116, and determine whether a locally generated behavior information structure (or the behavior it characterizes) is included in the received list, increase its level of security or scrutiny in response to determining that locally generated behavior information structure is not included in the received list or that the received behavior information structure does not match its corresponding local behavior information structure (i.e., when the comparison results indicate that an observed behavior of the software application differs or deviates from the expected behavior). The device processor may also send the results of its analysis to the server 116, which may receive and use these results to further analyze the software application to determine whether it is malware and/or to better determine the range of normal or expected behaviors of the software application.

In addition to the operation discussed above, the behavior observer module 202 may be configured to instrument application programming interfaces (APIs) at various levels/modules of the device, and monitor the activities, conditions, operations, and events (e.g., system events, state changes, etc.) at the various levels/modules over a period of time via the instrumented APIs. The behavior observer module 202 may collect behavior information pertaining to the monitored activities, conditions, operations, or events, and store the collected information in a memory (e.g., in a log file, etc.). The behavior observer module 202 may communicate (e.g., via a memory write operation, function call, etc.) the collected behavior information to the behavior extractor module 204.

The behavior extractor module 204 may be configured to receive or retrieve the collected behavior information, and use this information to generate one or more behavior information structures. In an embodiment, the behavior extractor module 204 may be configured to generate the behavior information structures to include a concise definition of the observed behaviors. For example, each behavior information structure may succinctly describe observed behavior of the mobile device, software application, or process in a value or vector data-structure (e.g., in the form of a string of numbers, etc.). The behavior extractor module 204 may also be configured to generate the behavior information structures so that they function as an identifier that enables the mobile device system (e.g., the behavior analyzer module 206) to quickly recognize, identify, and/or analyze mobile device behaviors.

The behavior analyzer module 206 may be configured to apply the behavior information structures to classifier modules to determine if a device behavior is a non-benign behavior that is contributing to (or are likely to contribute to) the device's degradation over time and/or which may otherwise cause problems on the device. The behavior analyzer module 206 may notify the actuator module 208 that an activity or behavior is not benign. In response, the actuator module 208 may perform various actions or operations to heal, cure, isolate, or otherwise fix identified problems. For example, the actuator module 208 may be configured to terminate a software application or process when the result of applying the behavior information structure to the classifier model (e.g., by the analyzer module) indicates that a software application or process is not benign.

The behavior observer module 202 may be configured to monitor the activities of the mobile computing device 102. In various embodiments, this may be accomplishing by monitoring various software and hardware components of the mobile computing device 102 and collecting information pertaining to the communications, transactions, events, or operations of the monitored and measurable components that are associated with the activities of the mobile computing device 102. Such activities include a software application's performance of an operation or task, a software application's execution in a processor or processing core of the mobile computing device 102, the execution of process, the performance of a task or operation, a device behavior, the use of a hardware component, etc.

In various embodiments, the behavior observer module 202 may be configured to monitor the activities of the mobile computing device 102 by collecting information pertaining to library API calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voicemail (VoiceMailComm), device identifiers (DeviceID-Comm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an embodiment, the behavior observer module 202 may be configured to perform coarse observations by monitoring/observing an initial set of behaviors or factors that are a small subset of all factors that could contribute to the computing device's degradation. In an embodiment, the behavior observer module 202 may receive the initial set of behaviors and/or factors from a server and/or a component in a cloud service or network. In an embodiment, the initial set of behaviors/factors may be specified in machine learning classifier models.

Each classifier model may be a behavior model that includes data and/or information structures (e.g., feature vectors, behavior vectors, component lists, etc.) that may be used by a computing device processor to evaluate a specific feature or embodiment of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign.

A locally generated lean classifier model is a lean classifier model that is generated in the computing device. An application-specific classifier model is a classifier model that includes a focused data model that includes/tests only the features/entries that are most relevant for evaluating a particular software application. A device-specific classifier model is a classifier model that includes a focused data model that includes/tests only computing device-specific features/entries that are determined to be most relevant to classifying an activity or behavior in a specific computing device.

The behavior analyzer module 206 may be configured to apply the behavior information structures generated by the behavior extractor module 204 to a classifier model to determine whether a monitored activity (or behavior) is benign, suspicious, or non-benign. In an embodiment, the behavior analyzer module 206 may classify a behavior as "suspicious" when the results of its behavioral analysis operations do not provide sufficient information to classify the behavior as either benign or non-benign.

The behavior analyzer module 206 may be configured to notify the behavior observer module 202 in response to determining that a monitored activity or behavior is suspicious. In response, the behavior observer module 202 may adjust the granularity of its observations (i.e., the level of detail at which computing device features are monitored) and/or change the factors/behaviors that are observed based on information received from the behavior analyzer module 206 (e.g., results of the real-time analysis operations), generate or collect new or additional behavior information, and send the new/additional information to the behavior analyzer module 206 for further analysis/classification. Such feedback communications between the behavior observer module 202 and the behavior analyzer module 206 enable the mobile computing device 102 to recursively increase the granularity of the observations (i.e., make finer or more detailed observations) or change the features/behaviors that are observed until an activity is classified, a source of a suspicious or performance-degrading computing device behavior is identified, until a processing or battery consumption threshold is reached, or until the computing device processor determines that the source of the suspicious or performance-degrading computing device behavior cannot be identified from further increases in observation granularity. Such feedback communication also enable the mobile computing device 102 to adjust or modify the classifier models locally in the computing device without consuming an excessive amount of the computing device's processing, memory, or energy resources.

In an embodiment, the behavior observer module 202 and the behavior analyzer module 206 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. This allows the mobile computing device 102 to efficiently identify and prevent problems without requiring a large amount of processor, memory, or battery resources on the device.

In various embodiments, the mobile computing device processor may be configured to monitor, analyze, and/or classify activities or behaviors by identifying a critical data resource that requires close monitoring, identifying an intermediate resource associated with the critical data resource, monitoring API calls made by a software application when accessing the critical data resource and the intermediate resource, identifying computing device resources that are consumed or produced by the API calls, identifying a pattern of API calls as being indicative of non-benign activity by the software application, generating a light-weight behavior signature based on the identified pattern of API calls and the identified computing device resources, using the light-weight behavior signature to perform behavior analysis operations, and determining whether the software application is benign or not benign based on the behavior analysis operations.

In various embodiments, the mobile computing device processor may be configured to monitor, analyze, and/or classify activities or behaviors by identifying APIs that are used most frequently by software applications executing on the computing device, storing information regarding usage of identified hot APIs in an API log in a memory of the computing device, and performing behavior analysis operations based on the information stored in the API log to identify behaviors that are inconsistent with normal operation patterns. In an embodiment, the API log may be generated so that it is organized such that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various embodiments, the mobile computing device processor may be configured to monitor, analyze, and/or classify activities or behaviors by receiving from a server a full classifier model that includes a finite state machine that is suitable for conversion or expression as a plurality of boosted decision stumps, generating a lean classifier model in the computing device based on the full classifier, and using the lean classifier model in the computing device to classify the activities or behaviors as being either benign or not benign (i.e., malicious, performance degrading, etc.). In an embodiment, generating the lean classifier model based on the full classifier model may include determining a number of unique test conditions that should be evaluated to classify an activity or behavior without consuming an excessive amount of processing, memory, or energy resources of the computing device, generating a list of test conditions by sequentially traversing the list of boosted decision stumps and inserting the test condition associated with each sequentially traversed boosted decision stump into the list of test conditions until the list of test conditions includes the determined number of unique test conditions, and generating the lean classifier model to include only those boosted decision stumps that test one of a plurality of test conditions included in the generated list of test conditions.

In various embodiments, the mobile computing device processor may be configured to monitor, analyze, and/or classify activities or behaviors by using device-specific information, such as capability and state information, of the computing device to identify device-specific test conditions in a plurality of test conditions that are relevant to classifying a behavior of the computing device, generating a lean classifier model that includes only the identified computing device-specific test conditions, and using the generated lean classifier model in the computing device to classify the behavior of the computing device. In an embodiment, the lean classifier model may be generated to include only decision nodes that evaluate a computing device feature that is relevant to a current operating state or configuration of the computing device. In an embodiment, generating the lean classifier model may include determining a number of unique test conditions that should be evaluated to classify the behavior without consuming an excessive amount of computing device's resources (e.g., processing, memory, or energy resources), generating a list of test conditions by sequentially traversing the plurality of test conditions in the full classifier model, inserting those test conditions that are relevant to classifying the behavior of the computing device into the list of test conditions until the list of test conditions includes the determined number of unique test conditions, and generating the lean classifier model to include decision nodes included in the full classifier model that test one of the conditions included in the generated list of test conditions.

In various embodiments, the mobile computing device processor may be configured to monitor, analyze, and/or classify activities or behaviors by monitoring an activity of a software application or process, determining an operating system execution state of the software application/process, and determining whether the activity is a critical activity based the operating system execution state of the software application or process during which the activity was monitored. In an further embodiment, the device processor may determine whether the operating system execution state of the software application or process is relevant to the activity, generate a shadow feature value that identifies the operating system execution state of the software application or process during which the activity was monitored, generate a behavior information structure that associates the activity with the shadow feature value identifying the operating system execution state, and use the behavior information structure to determine whether the activity is a critical activity and/or not benign.

In various embodiments, the mobile computing device processor may be configured to monitor, analyze, and/or classify activities or behaviors by monitoring an activity of a software application or process, determining an application-and-operating-system-agnostic execution state of the software application/process, and determining whether the activity is a critical activity or not benign based on the activity and/or the application-and-operating-system-agnostic execution state of the software application during which the activity was monitored. In an further embodiment, the mobile computing device processor may determine whether the application-and-operating-system-agnostic execution state of the software application is relevant to the activity, and generate a behavior information structure that associates the activity with the application-and-operating-system-agnostic execution state, and use the behavior information structure to determine whether the activity is a critical activity and/or not benign. The processor may also use the application-and-operating-system-agnostic execution state to select a classifier model (e.g., application-specific classifier model), and apply the behavior information structure to the selected classifier model to determine whether the activity is a critical activity and/or not benign.

In the various embodiments, the mobile computing device processor may be configured to work in conjunction with a network server to intelligently and efficiently identify the features, factors, and data points that are most relevant to determining whether an activity is a critical activity and/or not benign. For example, the mobile computing device processor may be configured to receive a full classifier model from the network server, and use the received full classifier model to generate lean classifier models (i.e., data/behavior models) that are specific for the features and functionalities of the computing device or the software applications of the computing device. The mobile computing device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various embodiments, the mobile computing device processor may be configured to generate one or more lean classifier models by converting a finite state machine representation/expression into boosted decision stumps, pruning or culling the full set of boosted decision stumps based on computing device-specific states, features, behaviors, conditions, or configurations to include subset or subsets of boosted decision stumps included in the full classifier model, and using the subset or subsets of boosted decision stumps to intelligently monitor, analyze and/or classify a computing device behavior.

Boosted decision stumps are one level decision trees that have exactly one node (and thus one test question or test condition) and a weight value, and thus are well suited for use in a binary classification of data/behaviors. That is, applying a behavior information structure to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

In an embodiment, the mobile computing device processor may be configured to generate a lean classifier model that includes a subset of classifier criteria included in the full classifier model and only those classifier criteria corresponding to the features relevant to the computing device configuration, functionality, and connected/included hardware. The device processor may use this lean classifier model(s) to monitor only those features and functions present or relevant to the device. The device processor may then periodically modify or regenerate the lean classifier model(s) to include or remove various features and corresponding classifier criteria based on the computing device's current state and configuration.

As an example, the mobile computing device processor may be configured to receive a large boosted-decision-stumps classifier model that includes decision stumps associated with a full feature set of behavior models (e.g., classifiers), and derive one or more lean classifier models from the large classifier models by selecting only features from the large classifier model(s) that are relevant the computing device's current configuration, functionality, operating state and/or connected/included hardware, and including in the lean classifier model a subset of boosted decision stumps that correspond to the selected features. In this embodiment, the classifier criteria corresponding to features relevant to the computing device may be those boosted decision stumps included in the large classifier model that test at least one of the selected features. The device processor may then periodically modify or regenerate the boosted decision stumps lean classifier model(s) to include or remove various features based on the computing device's current state and configuration so that the lean classifier model continues to include application-specific or device-specific feature boosted decision stumps.

In addition, the device processor may also dynamically generate application-specific classifier models that identify conditions or features that are relevant to a specific software application (Google® wallet) and/or to a specific type of software application (e.g., games, navigation, financial, news, productivity, etc.). In an embodiment, these classifier models may be generated to include a reduced and more focused subset of the decision nodes that are included in the full classifier model or of those included in lean classifier model generated from the received full classifier model.

In various embodiments, the device processor may be configured to generate application-based classifier models for each software application in the system and/or for each type of software application in the system. The device processor may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various embodiments, device processor may be configured to generate the application-based classifier models dynamically, reactively, proactively, and/or every time a new application is installed or updated.

Each software application generally performs a number of tasks or activities on the computing device. The specific execution state in which certain tasks/activities are performed in the computing device may be a strong indicator of whether a behavior or activity merits additional or closer scrutiny, monitoring and/or analysis. As such, in the various embodiments, the device processor may be configured to use information identifying the actual execution states in which certain tasks/activities are performed to focus its behavioral monitoring and analysis operations, and better determine whether an activity is a critical activity and/or whether the activity is not benign.

In various embodiments, the device processor may be configured to associate the activities/tasks performed by a software application with the execution states in which those activities/tasks were performed. For example, the device processor may be configured to generate a behavior information structure that includes the behavior information collected from monitoring the instrumented components in a sub-vector or other data-structure that lists the features, activities, or operations of the software for which the execution state is relevant (e.g., location access, SMS read operations, sensor access, etc.). In an embodiment, this sub-vector/data-structure may be stored in association with a shadow feature value sub-vector/data-structure that identifies the execution state in which each feature/activity/operation was observed. As an example, the device processor may generate a behavior vector that includes a "location background" data field whose value identifies the number or rate that the software application accessed location information when it was operating in a background state. This allows the device processor to analyze this execution state information independent of and/or in parallel with the other observed/monitored activities of the computing device. Generating the behavior information structure in this manner also allows the system to aggregate information (e.g., frequency or rate) over time.

In various embodiments, the device processor may be configured to generate the behavior information structures to include information that may be input to a decision node in the machine learning classifier to generate an answer to a query regarding the monitored activity.

In various embodiments, the device processor may be configured to generate the behavior information structures to include a concise definition of the observed/monitored behaviors. The behavior information structure may succinctly describe an observed behavior of the computing device, software application, or process in a value or vector data-structure (e.g., in the form of a string of numbers, etc.). The behavior information structure may also function as an identifier that enables the computing device system to quickly recognize, identify, and/or analyze computing device behaviors.

In various embodiments, the device processor may be configured to generate the behavior information structures to include a plurality or series of numbers, each of which signifies or characterizes a feature, activity, or a behavior of the mobile computing device 102. For example, numbers included in the behavior information structure may signify whether a camera of the computing device is in use (e.g., as zero or one), how much network traffic has been transmitted from or generated by the computing device (e.g., 20 KB/sec, etc.), how many internet messages have been communicated (e.g., number of SMS messages, etc.), etc. In an embodiment, the behavior information structure may encapsulate one or more "behavior features." Each behavior feature may be an abstract number that represents all or a portion of an observed behavior or action. The behavior features may be agnostic to the hardware or software configuration of the computing device.

In various embodiments, the device processor may be configured to generate the behavior information structures to include execution information. The execution information may be included in the behavior information structure as part of a behavior (e.g., camera used 5 times in 3 second by a background process, camera used 3 times in 3 second by a foreground process, etc.) or as part of an independent feature. In an embodiment, the execution state information may be included in the behavior information structure as a shadow feature value sub-vector or data structure. In an embodiment, the behavior information structure may store the shadow feature value sub-vector/data structure in association with the features, activities, tasks for which the execution state is relevant.

In an embodiment, the device processor may be configured to receive artificial attack software from a network server 116, install the artificial attack software, monitor the operations, accuracy, and performance of the various modules 202-208 of behavioral monitoring and analysis system 200, generate reports that characterize the operations the system 200 and/or the modules 202-208, and send the generated reports to the network server 116. The device processor may also be configured to set a timer, listen for "system-OK" signals after sending the reports to the network server 116, and perform dead-man operations if a "system-OK" signal has not been received when the timer expires. In addition, the device processor may be configured listen for a "dead-man" signal indicating that there has been a disruption to the behavioral monitoring and analysis system, and to perform dead-man operations in response to receiving a "dead-man" signal.

Figure 3:
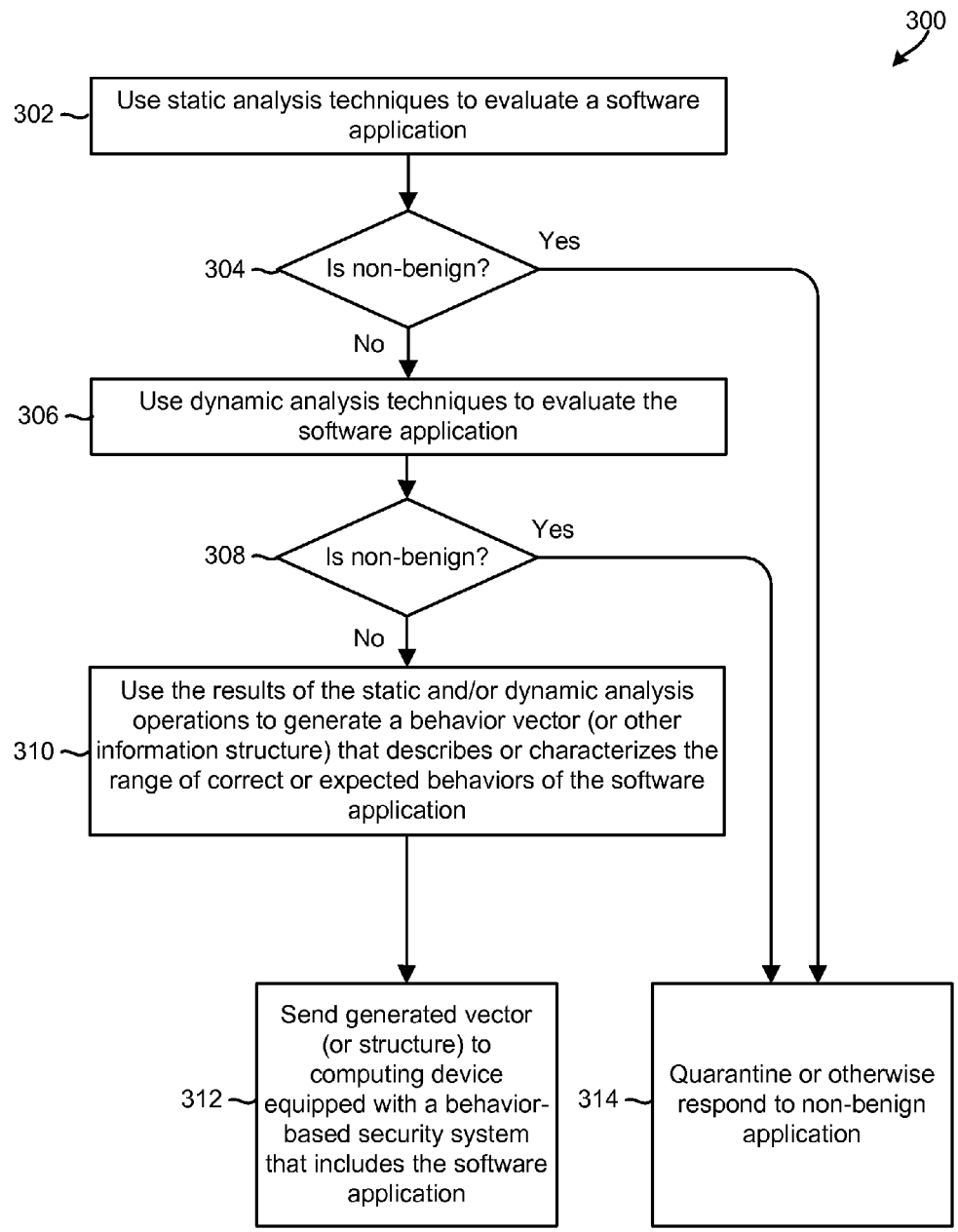
FIGS. 3 and 4 are process flow diagrams illustrating methods of analyzing a software application in accordance with various embodiments.

FIG. 3 illustrates a server method 300 for analyzing a software application in accordance with an embodiment. Method 300 may be performed by a processor or processing core of a computing device (e.g., a server computing device). In example the illustrated in FIG. 3, the operations of blocks 302 and 304 are performed before the operations of blocks 306 and 308. In other embodiments, the operations of blocks 306 and 308 may be performed before or concurrent with the operations of blocks 302 and 304.

In block 302, the computing device may use static analysis techniques to evaluate a software application and generate static analysis results. For example, the computing device may perform static analysis operations that include analyzing the byte code of a software application program to identify codepaths, identifying all of the possible operations or behavior of the software application, and/or evaluating the intent of a software application (e.g., to determine whether it is malicious, etc.) to generate the static analysis results. In determination block 304, the computing device may use the static analysis results to determine whether the software application is non-benign. In response to determining that the software application is non-benign (i.e., determination block 304="Yes"), the computing device may quarantine the application program or take other appropriate measures in block 314. For example, the computing device may prevent other computing devices from downloading the software application in block 314.

In response to determining that the static analysis results do not indicate that the software application is non-benign (i.e., determination block 304="No"), the computing device may use dynamic analysis techniques to evaluate the software application and generate dynamic analysis results in block 306. For example, the computing device may perform dynamic analysis operations, such as executing the byte code in an emulator (e.g., in the cloud) to identify or determine its behaviors. In response to determining that the software application is non-benign (i.e., determination block 308="Yes"), the computing device may quarantine the application program or take other appropriate measures in block 314.

In response to determining that the dynamic analysis results do not indicate that the software application is non-benign (i.e., determination block 308="No"), the computing device may use the static analysis results (i.e., the results generated in block 302) and/or the static analysis results (i.e., the results generated in block 302) to generate a behavior information structure, such as a vector, vector list, or other similar data structure, that identifies the range of correct or expected behaviors of the software application program in block 310. That is, in block 310, the computing device may use the results of the static and/or dynamic analysis operations to generate a behavior information structure that describes or characterizes the range of correct or expected behaviors of the software application in block 310. In block 312, the computing device may send the generated behavior information structure to a client computing device (e.g., a mobile device) equipped with a behavior based security system, and which includes the software application in question.

In an embodiment, in addition to the static and dynamic analysis operations discussed above, the computing device may emulate the execution environment of the client computing device and/or the behavior monitoring and analysis system of the client computing device, execute the software application in the emulated execution environment (e.g., along all the identified code paths), perform behavior-based analysis operations to identify all the operations performed or behaviors exhibited by the software application, and generate the behavior information structure (e.g., a vector or vector list) to include the identified operations or behaviors (e.g., in block 310). For example, the computing device may generate one or more behavior vectors for each of the identified code paths, package these behavior vectors into a vector list, and send the vector list to the client computing device. By emulating the execution environment of the client computing device, the server computing device may generate behavior information structures that characterize all the normal or expected operations of the client computing device executing the application using similar values, formats, structures as those used by the behavior-based security system of the client computing device. This may allow the client computing device to more readily compare the behavior information structures received from the server to the behavior information structures generated locally in that device.

Figure 4:
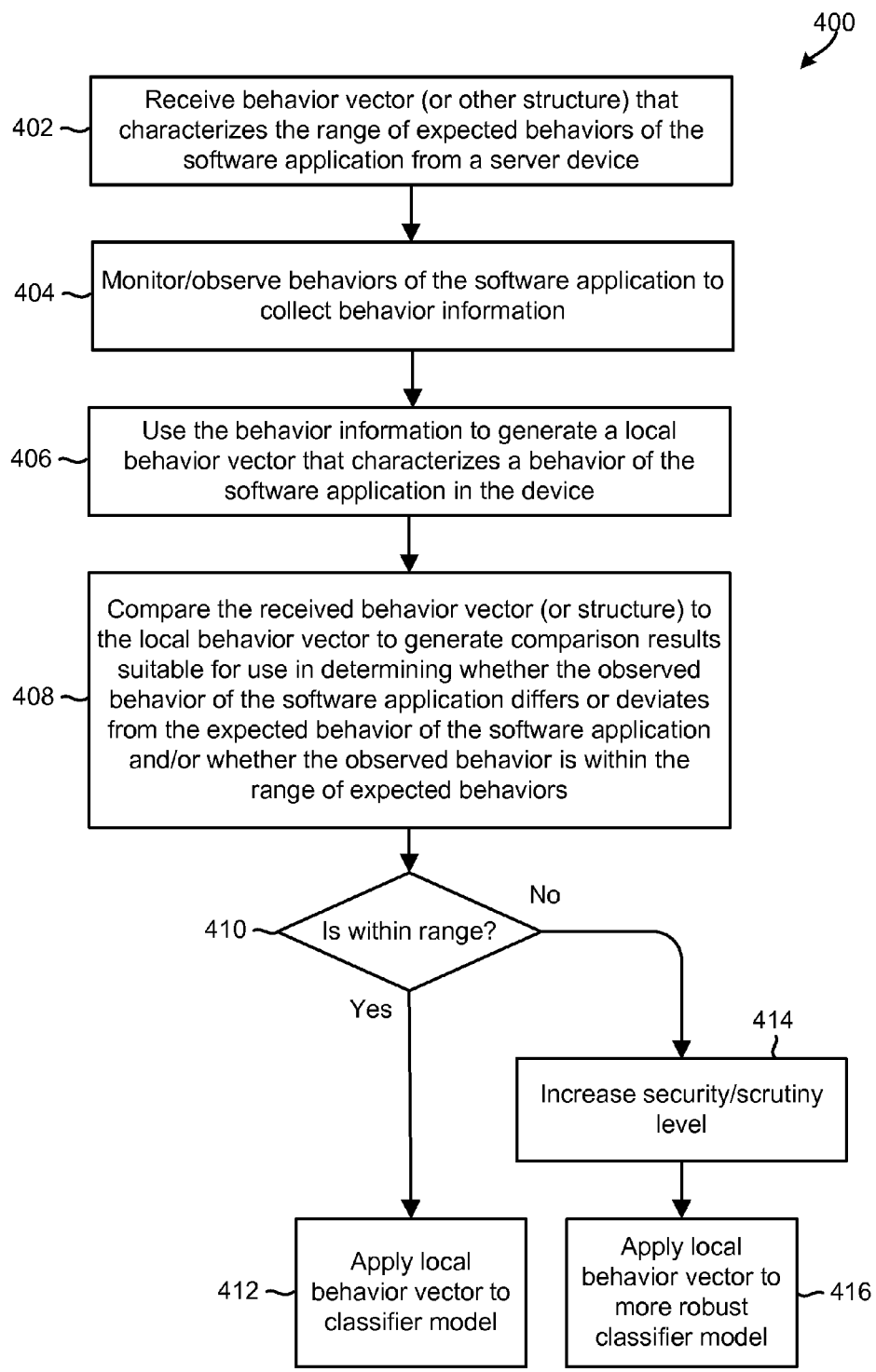

FIG. 4 illustrates a method 400 of determining the level of security/security that should be applied when analyzing a software application in accordance with an embodiment. Method 400 may be performed by a processor or processing core of a computing device (e.g., a mobile or resource-constrained computing device).

In block 402, the computing device may receive behavior information structure that characterizes the range of expected behaviors of the software application from a server device. In block 404, the computing device may monitor/observe behaviors of the software application to collect local behavior information (e.g., via the behavior observer module discussed above with reference to FIG. 2). In block 406, the computing device may use the behavior information to generate a local behavior information structure that characterizes a behavior of the software application or the behavior of the device when executing the software application. In block 408, the computing device may compare the received behavior information structure to the local behavior information structure to generate comparison results that may be used to determine whether the observed behavior of the software application differs or deviates from the expected behavior of the software application and/or whether the observed behavior is within the range of expected behaviors.

In determination block 410, the computing device may use the comparison results to determine whether the observed behavior is within the range of expected behaviors.

In response to determining that the observed behavior is within the range of expected behaviors (i.e., determination block 410="Yes"), the computing device may apply the local behavior information structure to a relatively lean classifier model and/or perform normal behavior-monitoring analysis operations in block 412. In response to determining that the observed behavior is not within the range of expected behaviors (i.e., determination block 410="No"), the computing device may increase its security/scrutiny level in block 414 and/or apply the local behavior information structure to a more robust classifier in block 416.

Figure 5:
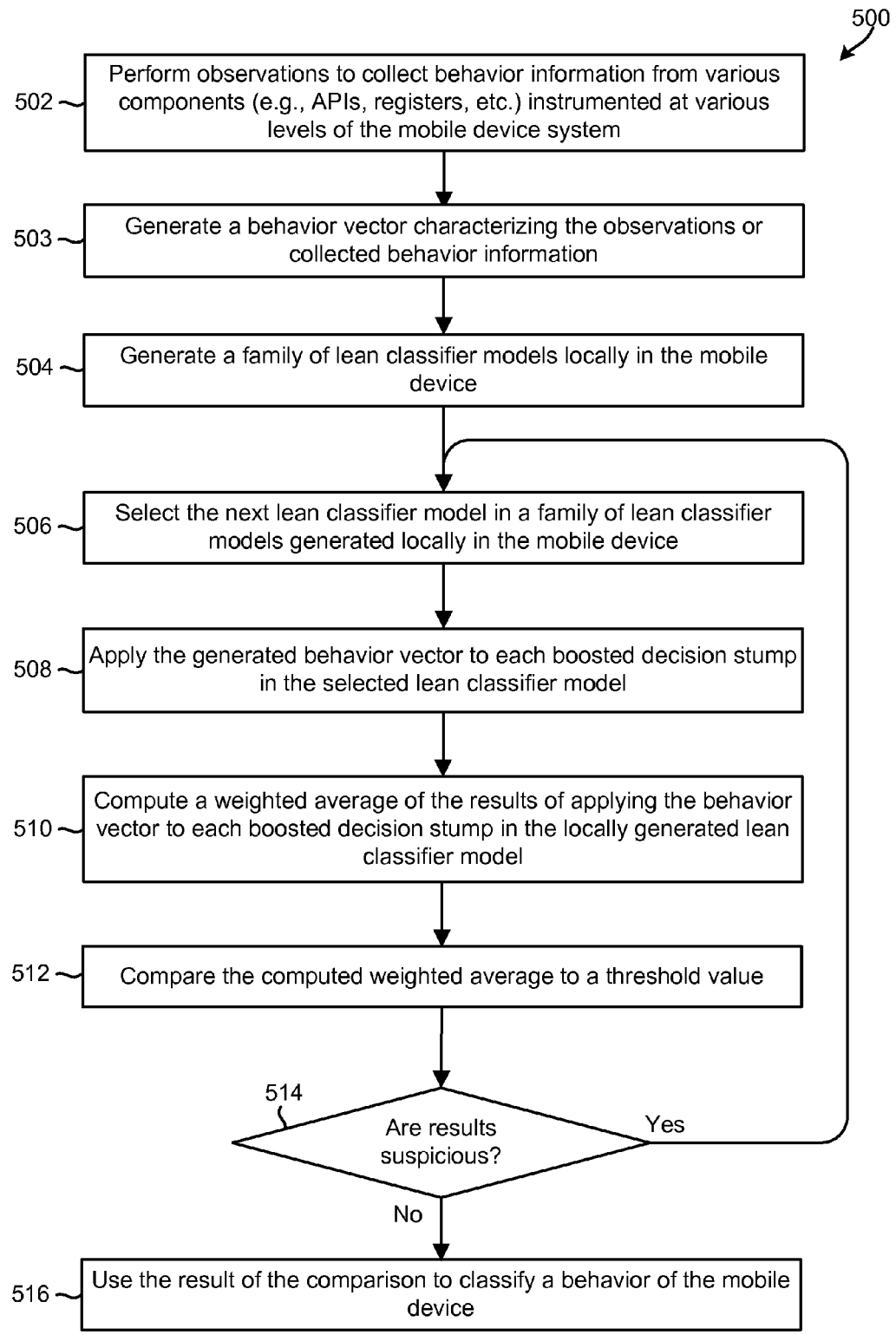
FIG. 5 is a process flow diagram illustrating a method of generating classifier models that are suitable for use in classifying device behaviors in accordance with the various embodiments.

FIG. 5 illustrates an embodiment method 500 of using a classifier model to classify a behavior of the mobile device. Method 500 may be performed by a processor or processing core in a computing device (e.g., a mobile or resource constrained device, etc.), either independently or as part of the operations described above with reference to FIGS. 2-4. For example, in various embodiments, the computing device may be configured to perform the operations of blocks 504-516 illustrated in FIG. 5 as part of the operations of any of blocks 412 through 416 illustrated in FIG. 4. In some embodiments, the computing device may be configured to perform the operations of blocks 404 and 406 as part of the operations of blocks 502 and 503.

With reference to FIG. 5, in block 502, the computing device my perform observations (e.g., via its processor/processing core) to collect local behavior information from various components that are instrumented at various levels of the mobile device system. In an embodiment, this may be accomplished via the behavior observer module 202 discussed above with reference to FIG. 2. In block 503, the computing device may generate a behavior information structure characterizing the observations, the collected behavior information and/or a mobile device behavior. In block 504, the computing device may use a full classifier model (e.g., a model received from a network server, etc.) to generate a lean classifier model or a family of lean classifier models of varying levels of complexity (or "leanness"). To accomplish this, computing device may cull a family of boosted decision stumps included in the full classifier model to generate lean classifier models that include a reduced number of boosted decision stumps and/or evaluate a limited number of test conditions.

In block 506, the computing device may select the leanest classifier in the family of lean classifier models (i.e., the model based on the fewest number of different mobile device states, features, behaviors, or conditions) that has not yet been evaluated or applied by the mobile device. In an embodiment, this may be accomplished by the computing device selecting the first classifier model in an ordered list of classifier models.

In block 508, the computing device may apply collected behavior information or behavior information structures to each boosted decision stump in the selected lean classifier model. Because boosted decision stumps are binary decisions and the lean classifier model is generated by selecting many binary decisions that are based on the same test condition, the process of applying a behavior information structure to the boosted decision stumps in the lean classifier model may be performed in a parallel operation. Alternatively, the behavior information structure applied in block 530 may be truncated or filtered to just include the limited number of test condition parameters included in the lean classifier model, thereby further reducing the computational effort in applying the model.

In block 510, the computing device may compute or determine a weighted average of the results of applying the collected behavior information to each boosted decision stump in the lean classifier model. In block 512, the computing device may compare the computed weighted average to a threshold value. In determination block 514, the computing device may determine whether the results of this comparison and/or the results generated by applying the selected lean classifier model are suspicious. For example, the computing device may determine whether these results may be used to classify a behavior as either malicious or benign with a high degree of confidence, and if not treat the behavior as suspicious.

If the computing device determines that the results are suspicious (e.g., determination block 514="Yes"), the computing device may repeat the operations in blocks 506-512 to select and apply a stronger (i.e., less lean) classifier model that evaluates more device states, features, behaviors, or conditions until the behavior is classified as malicious or benign with a high degree of confidence. If the computing device determines that the results are not suspicious (e.g., determination block 514="No"), such as by determining that the behavior can be classified as either benign or non-benign with a high degree of confidence, in block 516, the computing device may use the result of the comparison generated in block 512 to classify a behavior of the mobile device as benign, non-benign or potentially malicious.

In an alternative embodiment method, the operations described above may be accomplished by sequentially selecting a boosted decision stump that is not already in the lean classifier model, identifying all other boosted decision stumps that depend upon the same mobile device state, feature, behavior, or condition as the selected decision stump (and thus can be applied based upon one determination result), including in the lean classifier model the selected and all identified other boosted decision stumps that depend upon the same mobile device state, feature, behavior, or condition, and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Figure 6:
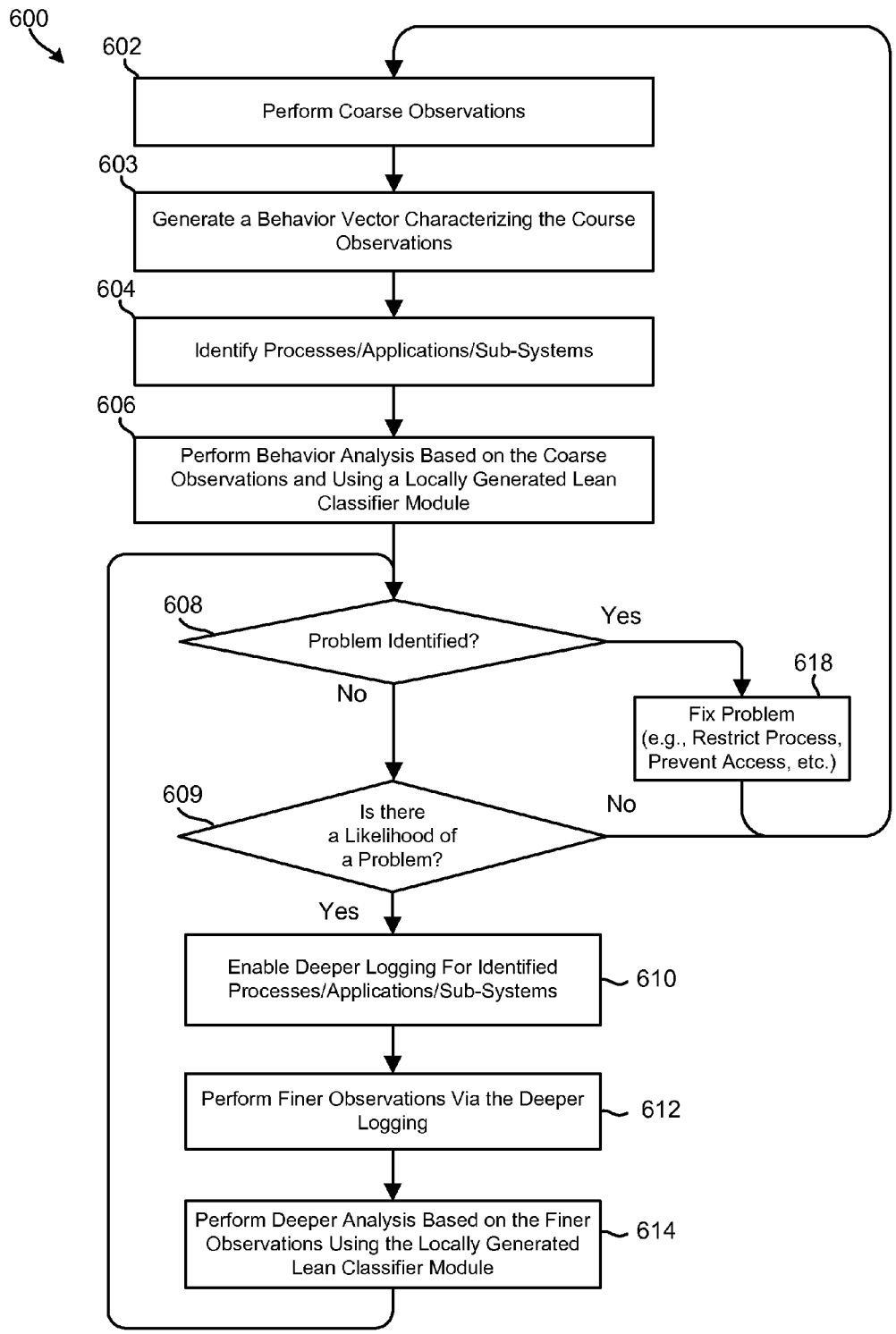
FIG. 6 is a process flow diagram illustrating a method for performing behavioral monitoring and analysis operations in accordance with an embodiment.

FIG. 6 illustrates an example method 600 for performing dynamic and adaptive observations in accordance with an embodiment. Method 600 may be performed by a processor or processing core in a computing device (e.g., a mobile or resource constrained device, etc.), either independently or as part of the methods or operations described above with reference to FIGS. 2-5. For example, in some embodiments, the computing device may be configured to perform the operations of blocks 404 and 406 illustrated in FIG. 4 as part of the operations of blocks 602 and 603 illustrated in FIG. 6. In some embodiments, the computing device may be configured to perform the operations of blocks 604-618 illustrated in FIG. 6 as part of the operations of any of blocks 412 through 416 illustrated in FIG. 4.

In block 602, the computing device may perform coarse observations by monitoring/observing a subset of a large number factors/behaviors that could contribute to the mobile device's degradation. In block 603, the computing device may generate a behavior information structure characterizing the coarse observations and/or the mobile device behavior based on the coarse observations. In block 604, the computing device may identify subsystems, processes, and/or applications associated with the coarse observations that may potentially contribute to the mobile device's degradation. This may be achieved, for example, by comparing information received from multiple sources with contextual information received from sensors of the mobile device. In block 606, the computing device may perform behavioral analysis operations based on the coarse observations. In an embodiment, as part of blocks 603 and 604, the computing device may perform one or more of the operations discussed above with reference to FIGS. 2-10.

In determination block 608, the computing device may determine whether suspicious behaviors or potential problems can be identified and corrected based on the results of the behavioral analysis. When the computing device determines that the suspicious behaviors or potential problems can be identified and corrected based on the results of the behavioral analysis (i.e., determination block 608="Yes"), in block 618, the processor may initiate a process to correct the behavior and return to block 602 to perform additional coarse observations.

When the computing device determines that the suspicious behaviors or potential problems cannot be identified and/or corrected based on the results of the behavioral analysis (i.e., determination block 608="No"), in determination block 609 the computing device may determine whether there is a likelihood of a problem. In an embodiment, the computing device may determine that there is a likelihood of a problem by computing a probability of the mobile device encountering potential problems and/or engaging in suspicious behaviors, and determining whether the computed probability is greater than a predetermined threshold. When the computing device determines that the computed probability is not greater than the predetermined threshold and/or there is not a likelihood that suspicious behaviors or potential problems exist and/or are detectable (i.e., determination block 609="No"), the processor may return to block 602 to perform additional coarse observations.

When the computing device determines that there is a likelihood that suspicious behaviors or potential problems exist and/or are detectable (i.e., determination block 609="Yes"), the computing device may perform deeper logging/observations or final logging on the identified subsystems, processes or applications in block 610. In block 612, the computing device may perform deeper and more detailed observations on the identified subsystems, processes or applications. In block 614, the computing device may perform further and/or deeper behavioral analysis based on the deeper and more detailed observations.

In determination block 608, the computing device may again determine whether the suspicious behaviors or potential problems can be identified and corrected based on the results of the deeper behavioral analysis. When the computing device determines that the suspicious behaviors or potential problems cannot be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the computing device determines that the suspicious behaviors or potential problems can be identified and corrected based on the results of the deeper behavioral analysis (i.e., determination block 608="Yes"), in block 618, the computing device may perform operations to correct the problem/behavior, and the processor may return to block 602 to perform additional operations.

In an embodiment, as part of blocks 602-618 of method 600, the computing device may perform real-time behavior analysis of the system's behaviors to identify suspicious behaviors from limited and coarse observations, to dynamically determine the behaviors to observe in greater detail, and to dynamically determine the precise level of detail required for the observations. This enables the computing device to efficiently identify and prevent problems from occurring, without requiring the use of a large amount of processor, memory, or battery resources on the device.

In the various embodiments, a processor or processing core (collectively "processor") may be configured to perform operations for monitoring and analyzing behaviors via the behavior-monitoring security system of a target computing device. The behavior-monitoring security system may be a comprehensive behavioral monitoring and analysis system, such as the system 200 discussed above with reference to FIG. 2. In various embodiments, the processor may be included in the target computing device or in a different computing device as the target computing device.

Figure 7:
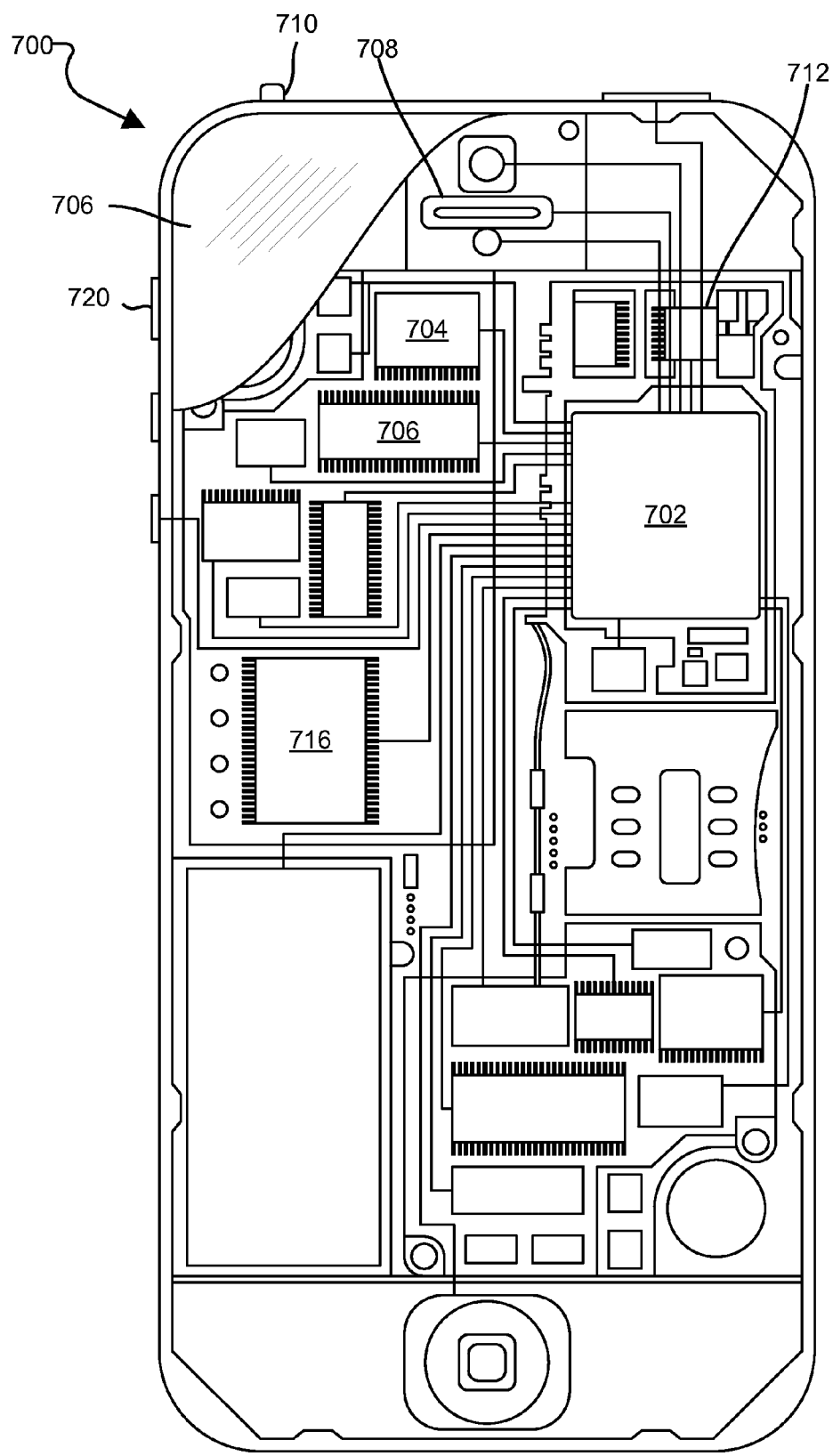
FIG. 7 is a component block diagram of a mobile device suitable for use with various embodiments.

The various embodiments may be implemented on a variety of computing devices, an example of which is illustrated in FIG. 7. Specifically, FIG. 7 is a system block diagram of a mobile computing device in the form of a smartphone/cell phone 700 suitable for use with any of the embodiments. The cell phone 700 may include a processor 702 coupled to internal memory 704, a display 706, and to a speaker 708. Additionally, the cell phone 700 may include an antenna 710 for sending and receiving electromagnetic radiation that may be connected to a wireless data link and/or cellular telephone transceiver 712 coupled to the processor 702. Cell phones 700 typically also include menu selection buttons or rocker switches 714 for receiving user inputs.

A typical cell phone 700 also includes a sound encoding/decoding (CODEC) circuit 716 that digitizes sound received from a microphone into data packets suitable for wireless transmission and decodes received sound data packets to generate analog signals that are provided to the speaker 708 to generate sound. Also, one or more of the processor 702, wireless transceiver 712 and CODEC 716 may include a digital signal processor (DSP) circuit (not shown separately). The cell phone 700 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 8:
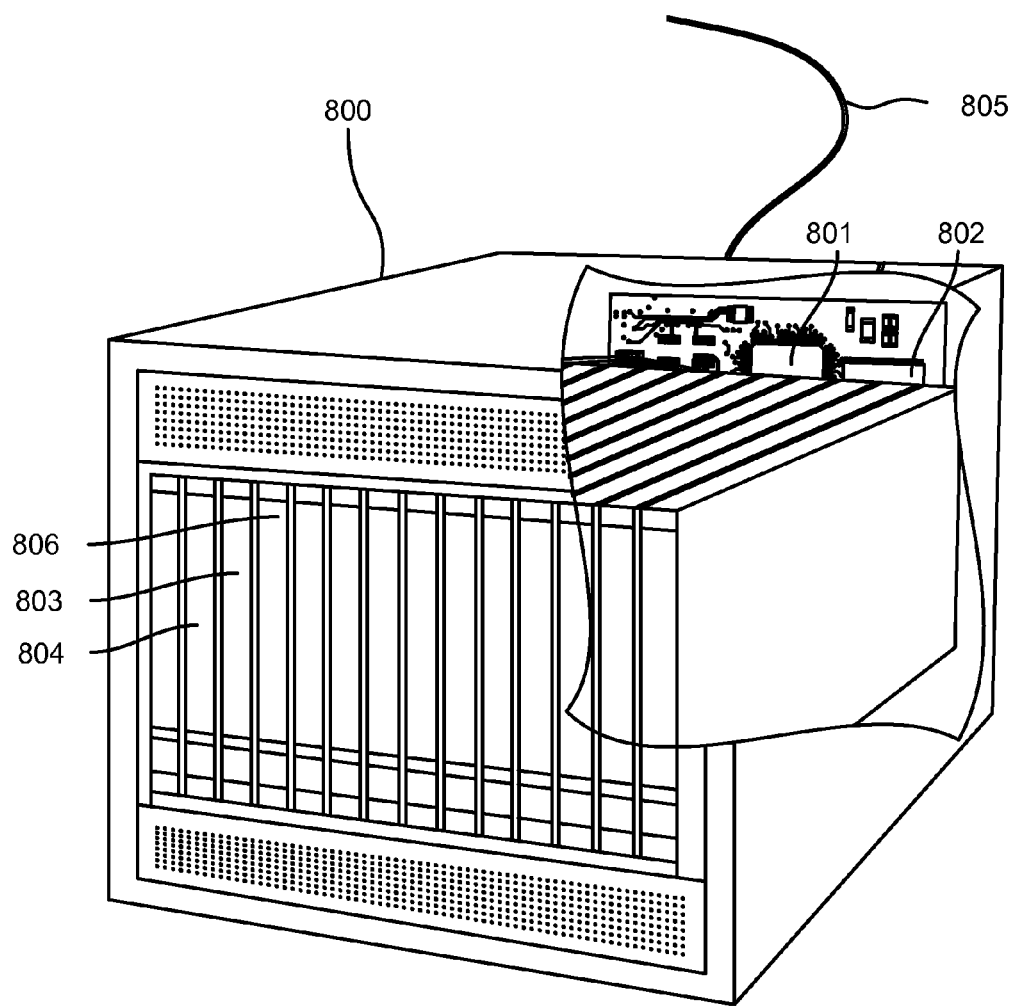
FIG. 8 is a component block diagram of a server device suitable for use with various embodiments.

The embodiments and network servers described above may be implemented in variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other communication system computers and servers.

The processors 702, 801, may be any programmable microprocessor, microcomputer or multiple processor chip or chips that can be configured by software instructions (applications) to perform a variety of functions, including the functions of the various embodiments described below. In some mobile devices, multiple processors 702 may be provided, such as one processor dedicated to wireless communication functions and one processor dedicated to running other applications. Typically, software applications may be stored in the internal memory 704, 802, before they are accessed and loaded into the processor 902, 801. The processor 702, 801 may include internal memory sufficient to store the application software instructions. In some servers, the processor 801 may include internal memory sufficient to store the application software instructions. In some receiver devices, the secure memory may be in a separate memory chip coupled to the processor 801. The internal memory 704, 802 may be a volatile or nonvolatile memory, such as flash memory, or a mixture of both. For the purposes of this description, a general reference to memory refers to all memory accessible by the processor 702, 801, including internal memory 704, 802, removable memory plugged into the device, and memory within the processor 702, 801 itself.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of analyzing behaviors of a software application operating in a computing device, comprising:
receiving, via a processor of the computing device from a server device, a first behavior vector information structure;
receiving, via the processor, a list of features that could contribute to a degradation of the computing device;
generating, via the processor of the computing device, a second behavior vector information structure, wherein:
the received first behavior vector information structure includes a plurality of values that collectively identify a range of expected behaviors that the computing device should exhibit when executing the software application, and
the generated second behavior vector information structure includes values that collectively characterize an observed behavior of the software application;
comparing the received first behavior vector information structure to the generated second behavior vector information structure to determine whether there are deviations between observed and expected behaviors; and
generating a first machine learning classifier model based on the received list of features and applying the generated second behavior vector information structure to the first machine learning classifier model in response to determining, based on a result of comparing the received first behavior vector information structure to the generated second behavior vector information structure, that there are deviations between observed and expected behaviors.

2. The method of claim 1, wherein receiving the first behavior vector information structure comprises receiving a vector data structure that includes information derived from the server device performing at least one static analysis operation, and at least one dynamic analysis operation.

3. The method of claim 1, further comprising sending the result of comparing the received first behavior vector information structure to the generated second behavior vector information structure to the server device.

4. The method of claim 1, further comprising:
increasing a scrutiny level for evaluating the software application in response to determining, based on the result of comparing the received first behavior vector information structure to the generated second behavior vector information structure, that there are deviations between observed and expected behaviors.

5. The method of claim 1, further comprising using the result of applying the generated second behavior vector information structure to the first machine learning classifier model to determine whether the software application is non-benign.

6. The method of claim 1, further comprising:
applying the second behavior vector information structure to a second machine learning classifier model in response to determining, based on the result of comparing the received first behavior vector information structure to the generated second behavior vector information structure, that there are deviations between observed and expected behaviors; and
using the result generated by applying the second behavior vector information structure to the second machine learning classifier model to determine whether the software application is non-benign.

7. The method of claim 1, further comprising:
generating an application-specific classifier model that includes decision nodes that evaluate conditions in the computing device that are relevant to the software application operating in the computing device; and
applying the second behavior vector information structure to the generated application-specific classifier model in response to determining, based on the result of comparing the received first behavior vector information structure to the generated second behavior vector information structure, that there are deviations between observed and expected behaviors.

8. The method of claim 7, wherein generating the application-specific classifier model that includes the decision nodes that evaluate the conditions in the computing device that are relevant to the software application operating in the computing device comprises:
receiving, via the processor of the computing device, a full classifier model that includes a plurality of test conditions from the server device;
identifying device features used by the software application;
identifying test conditions in the plurality of test conditions that evaluate the identified device features; and
generating the application-specific classifier model to include the identified test conditions.

9. A computing device, comprising:
a hardware processor configured with processor-executable instructions to perform operations comprising:
receiving from a server device a first behavior vector information structure;
receiving a list of features that could contribute to a degradation of the computing device;
generating a second behavior vector information structure, wherein:
the received first behavior vector information structure includes a plurality of values that collectively identify a range of expected behaviors that the computing device should exhibit when executing a software application, and
the generated second behavior vector information structure includes values that collectively characterize an observed behavior of the software application;
comparing the received first behavior vector information structure to the generated second behavior vector information structure to determine whether there are deviations between observed and expected behaviors; and
generating a first machine learning classifier model based on the received list of features and applying the generated second behavior vector information structure to the first machine learning classifier model in response to determining, based on a result of comparing the received first behavior vector information structure to the generated second behavior vector information structure, that there are deviations between observed and expected behaviors.

10. The computing device of claim 9, wherein the hardware processor is configured with processor-executable instructions to perform operations such that receiving the first behavior vector information structure comprises receiving a vector data structure that includes information derived from the server device performing at least one static analysis operation and at least one dynamic analysis operation.

11. The computing device of claim 9, wherein the hardware processor is configured with processor-executable instructions to perform operations further comprising sending the result of comparing the received first behavior vector information structure to the generated second behavior vector information structure to the server device.

12. The computing device of claim 9, wherein the hardware processor is configured with processor-executable instructions to perform operations further comprising:
increasing a scrutiny level for evaluating the software application in response to determining, based on the result of comparing the received first behavior vector information structure to the generated second behavior vector information structure, that there are deviations between observed and expected behaviors.

13. The computing device of claim 9, wherein the hardware processor is configured with processor-executable instructions to perform operations further comprising using the result of applying the generated second behavior vector information structure to the first machine learning classifier model to determine whether the software application is non-benign.

14. The computing device of claim 9, wherein the hardware processor is configured with processor-executable instructions to perform operations further comprising:
applying the second behavior vector information structure to a second machine learning classifier model in response to determining, based on the result of comparing the received first behavior vector information structure to the generated second behavior vector information structure, that there are deviations between observed and expected behaviors; and
using the result generated by applying the second behavior vector information structure to the second machine learning classifier model to determine whether the software application is non-benign.

15. The computing device of claim 9, wherein the hardware processor is configured with processor-executable instructions to perform operations further comprising:
generating an application-specific classifier model that includes decision nodes that evaluate conditions in the computing device that are relevant to the software application operating in the computing device; and
applying the second behavior vector information structure to the generated application-specific classifier model in response to determining, based on the result of comparing the received first behavior vector information structure to the generated second behavior vector information structure, that there are deviations between observed and expected behaviors.

16. The computing device of claim 15, wherein the hardware processor is configured with processor-executable instructions to perform operations such that generating the application-specific classifier model that includes the decision nodes that evaluate the conditions in the computing device that are relevant to the software application operating in the computing device comprises:
receiving a full classifier model that includes a plurality of test conditions from the server device;
identifying device features used by the software application;
identifying test conditions in the plurality of test conditions that evaluate the identified device features; and
generating the application-specific classifier model to include the identified test conditions.

17. A non-transitory computer readable storage medium having stored thereon processor-executable software instructions configured to cause a processor of a computing device to perform operations comprising:
receiving from a server device a first behavior vector information structure;
receiving a list of features that could contribute to a degradation of the computing device;
generating a second behavior vector information structure, wherein:
the received first behavior vector information structure includes a plurality of values that collectively identify a range of expected behaviors that the computing device should exhibit when executing a software application, and the generated second behavior vector information structure includes values that collectively characterize an observed behavior of the software application;

comparing the received first behavior vector information structure to the generated second behavior vector information structure to determine whether there are deviations between observed and expected behaviors; and generating a first machine learning classifier model based on the received list of features and applying the generated second behavior vector information structure to the first machine learning classifier model in response to determining, based on a result of comparing the received first behavior vector information structure to the generated second behavior vector information structure, that there are deviations between observed and expected behaviors.

18. The non-transitory computer readable storage medium of claim 17, wherein the stored processor-executable software instructions are configured to cause a processor to perform operations such that receiving the first behavior vector information structure comprises receiving a vector data structure that includes information derived from the server device performing at least one static analysis operation, and at least one dynamic analysis operation.

19. The non-transitory computer readable storage medium of claim 17, wherein the stored processor-executable software instructions are configured to cause a processor to perform operations further comprising sending the result of comparing the received first behavior vector information structure to the generated second behavior vector information structure to the server device.

20. The non-transitory computer readable storage medium of claim 17, wherein the stored processor-executable software instructions are configured to cause a processor to perform operations further comprising:

increasing a scrutiny level for evaluating the software application in response to determining there are deviations between observed and expected behaviors.

21. The non-transitory computer readable storage medium of claim 17, wherein the stored processor-executable software instructions are configured to cause a processor to perform operations further comprising using the result of applying the generated second behavior vector information structure to the first machine learning classifier model to determine whether the software application is non-benign.

22. The non-transitory computer readable storage medium of claim 17, wherein the stored processor-executable software instructions are configured to cause a processor to perform operations further comprising:

applying the second behavior vector information structure to a second machine learning classifier model in response to determining, based on the result of comparing the received first behavior vector information structure to the generated second behavior vector information structure, that there are deviations between observed and expected behaviors; and using the result generated by applying the second behavior vector information structure to the second machine learning classifier model to determine whether the software application is non-benign.

23. The non-transitory computer readable storage medium of claim 17, wherein the stored processor-executable software instructions are configured to cause a processor to perform operations further comprising:

generating an application-specific classifier model that includes decision nodes that evaluate conditions in the computing device that are relevant to the software application operating in the computing device; and applying the second behavior vector information structure to the generated application-specific classifier model in response to determining, based on the result of comparing the received first behavior vector information structure to the generated second behavior vector information structure, that there are deviations between observed and expected behaviors.

24. The non-transitory computer readable storage medium of claim 23, wherein the stored processor-executable software instructions are configured to cause a processor to perform operations such that generating the application-specific classifier model that includes the decision nodes that evaluate the conditions in the computing device that are relevant to the software application operating in the computing device comprises:

receiving a full classifier model that includes a plurality of test conditions from the server device;

identifying device features used by the software application;

identifying test conditions in the plurality of test conditions that evaluate the identified device features; and generating the application-specific classifier model to include the identified test conditions.

25. A computing device, comprising:

means for receiving, via a microprocessor of the computing device from a server device, a first behavior vector information structure;

means for receiving a list of features that could contribute to a degradation of the computing device;

means for generating a second behavior vector information structure, wherein:

the received first behavior vector information structure includes a plurality of values that collectively identify a range of expected behaviors that the computing device should exhibit when executing a software application, and the generated second behavior vector information structure includes values that collectively characterize an observed behavior of the software application;

means for comparing the received first behavior vector information structure to the generated second behavior vector information structure to determine whether there are deviations between observed and expected behaviors; and means for generating a first machine learning classifier model based on the received list of features and applying the generated second behavior vector information structure to the first machine learning classifier model in response to determining, based on a result of comparing the received first behavior vector information structure to the generated second behavior vector information structure, that there are deviations between observed and expected behaviors.

26. The computing device of claim 25, further comprising:

means for increasing a scrutiny level for evaluating the software application in response to determining, based on the result of comparing the received first behavior vector information structure to the generated second behavior vector information structure, that there are deviations between observed and expected behaviors.

27. The computing device of claim 25, further comprising means for using the result of applying the generated second behavior vector information structure to the first machine learning classifier model to determine whether the software application is non-benign.

28. The computing device of claim 25, further comprising:
   means for applying the second behavior vector information structure to a second machine learning classifier model in response to determining, based on the result of comparing the received first behavior vector information structure to the generated second behavior vector information structure, that there are deviations between observed and expected behaviors; and
   means for using the result generated by applying the second behavior vector information structure to the second machine learning classifier model to determine whether the software application is non-benign.

29. The computing device of claim 25, further comprising:
   means for generating an application-specific classifier model that includes decision nodes that evaluate conditions in the computing device that are relevant to the software application operating in the computing device; and
   means for applying the second behavior vector information structure to the generated application-specific classifier model in response to determining, based on the result of comparing the received first behavior vector information structure to the generated second behavior vector information structure, that there are deviations between observed and expected behaviors.

30. The computing device of claim 29, wherein means for generating the application-specific classifier model that includes the decision nodes that evaluate the conditions in the computing device that are relevant to the software application operating in the computing device comprises:
   means for receiving a full classifier model that includes a plurality of test conditions from the server device;
   means for identifying device features used by the software application;
   means for identifying test conditions in the plurality of test conditions that evaluate the identified device features; and
   means for generating the application-specific classifier model to include the identified test conditions.

* * * * *